(12) United States Patent
Deshpande

(10) Patent No.: US 10,880,617 B2
(45) Date of Patent: Dec. 29, 2020

(54) SYSTEMS AND METHODS FOR SIGNALING QUALITY INFORMATION FOR REGIONS IN VIRTUAL REALITY APPLICATIONS

(71) Applicant: SHARP KABUSHIKI KAISHA, Osaka (JP)

(72) Inventor: Sachin G. Deshpande, Vancouver, WA (US)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/607,882

(22) PCT Filed: Feb. 14, 2018

(86) PCT No.: PCT/JP2018/005103
§ 371 (c)(1),
(2) Date: Oct. 24, 2019

(87) PCT Pub. No.: WO2018/198487
PCT Pub. Date: Nov. 1, 2018

(65) Prior Publication Data
US 2020/0068269 A1    Feb. 27, 2020

Related U.S. Application Data

(60) Provisional application No. 62/489,982, filed on Apr. 25, 2017, provisional application No. 62/511,277, filed on May 25, 2017.

(51) Int. Cl.
*H04N 21/00*     (2011.01)
*H04N 21/81*     (2011.01)
*H04N 21/2343*   (2011.01)
*H04N 21/84*     (2011.01)

(52) U.S. Cl.
CPC ... *H04N 21/816* (2013.01); *H04N 21/234345* (2013.01); *H04N 21/84* (2013.01)

(58) Field of Classification Search
CPC .......... H04N 21/234345; H04N 21/84; H04N 21/816
See application file for complete search history.

(56) References Cited

U.S. PATENT DOCUMENTS

| | | | |
|---|---|---|---|
| 2019/0253734 A1* | 8/2019 | Lee | H04L 67/02 |
| 2019/0373245 A1* | 12/2019 | Lee | H04N 21/26258 |
| 2020/0077070 A1* | 3/2020 | Takahashi | H04N 13/349 |
| 2020/0107007 A1* | 4/2020 | Yip | H04N 13/178 |

OTHER PUBLICATIONS

Hannuksela (Nokia) M M: "OMAF ROI-VE: Quality ranking indication", 117. MPEG Meeting; Jan. 16, 2017-Jan. 20, 2017; Geneva; (Motion Picture Expert Group or ISO/IEC JTC1/SC29/WG11), No. m39901 Jan. 11, 2017.

(Continued)

*Primary Examiner* — Zhihan Zhou
(74) *Attorney, Agent, or Firm* — ScienBiziP, P.C.

(57) ABSTRACT

A device may be configured to signal information (for example, is_stereo_content_flag, remaining_right_area_flag, remaining_both_area_flag, num_both_regions and num_right_regions associated with the relative quality of regions in an omni-directional video.

15 Claims, 7 Drawing Sheets

(56) References Cited

OTHER PUBLICATIONS

Miska M Hannuksela (Nokia) et al., "OMAF ROI-CE: Quality ranking indication-design resulting from the offline mark", 118. MPEG Meeting; Apr. 3, 2017-Apr. 7, 2017; Hobart; (Motion Picture Expert Group or ISO/IEC JTC1/SC29/WG11), No. m40707, Apr. 5, 2017.

Deshpande (Sharp) S: "[OMAF] on Region-Wise Quality Ranking", 119. MPEG Meeting; Jul. 17, 2017-Jul. 21, 2017; Torino; (Motion Picture Expert Group or ISO/IEC JTC1/SC29NVG11), No. m40786 May 26, 2017.

* cited by examiner

SYSTEMS AND METHODS FOR SIGNALING QUALITY INFORMATION FOR REGIONS IN VIRTUAL REALITY APPLICATIONS

CROSS REFERENCE

This Nonprovisional application claims priority under 35 U.S.C. § 119 on provisional Application No. 62/489,982 on Apr. 25, 2017 and provisional Application No. 62/511,277 on May 25, 2017, the entire contents of which are hereby incorporated by reference.

TECHNICAL FIELD

This disclosure relates to interactive video distribution and more particularly to techniques for signaling quality information for regions of video.

BACKGROUND ART

Digital media playback capabilities may be incorporated into a wide range of devices, including digital televisions, including so-called "smart" televisions, set-top boxes, laptop or desktop computers, tablet computers, digital recording devices, digital media players, video gaming devices, cellular phones, including so-called "smart" phones, dedicated video streaming devices, and the like. Digital media content (e.g., video and audio programming) may originate from a plurality of sources including, for example, over-the-air television providers, satellite television providers, cable television providers, online media service providers, including, so-called streaming service providers, and the like. Digital media content may be delivered over packet-switched networks, including bidirectional networks, such as Internet Protocol (IP) networks and unidirectional networks, such as digital broadcast networks.

Digital video included in digital media content may be coded according to a video coding standard. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of frames within a video sequence, a frame within a group of frames, slices within a frame, coding tree units (e.g., macroblocks) within a slice, coding blocks within a coding tree unit, etc.). Prediction coding techniques may be used to generate difference values between a unit of video data to be coded and a reference unit of video data. The difference values may be referred to as residual data. Residual data may be coded as quantized transform coefficients. Syntax elements may relate residual data and a reference coding unit. Residual data and syntax elements may be included in a compliant bitstream. Compliant bitstreams and associated metadata may be formatted according to data structures. Compliant bitstreams and associated metadata may be transmitted from a source to a receiver device (e.g., a digital television or a smart phone) according to a transmission standard. Examples of transmission standards include Digital Video Broadcasting (DVB) standards, Integrated Services Digital Broadcasting Standards (ISDB) standards, and standards developed by the Advanced Television Systems Committee (ATSC), including, for example, the ATSC 2.0 standard. The ATSC is currently developing the so-called ATSC 3.0 suite of standards.

SUMMARY OF INVENTION

In one example, a method of signaling quality information associated with one or more regions of an omnidirectional video comprises signaling a syntax element indicating whether the omnidirectional video is stereoscopic, and conditionally signaling one or more syntax elements specifying quality rankings of one or more regions based on whether the omnidirectional video is stereoscopic.

In one example, a method of parsing quality information associated with one or more regions of an omnidirectional video comprises parsing a syntax element indicating whether the omnidirectional video is stereoscopic, and conditionally parsing one or more syntax elements specifying quality rankings of one or more regions based on whether the omnidirectional video is stereoscopic.

DESCRIPTION OF EMBODIMENTS

Figure 1:
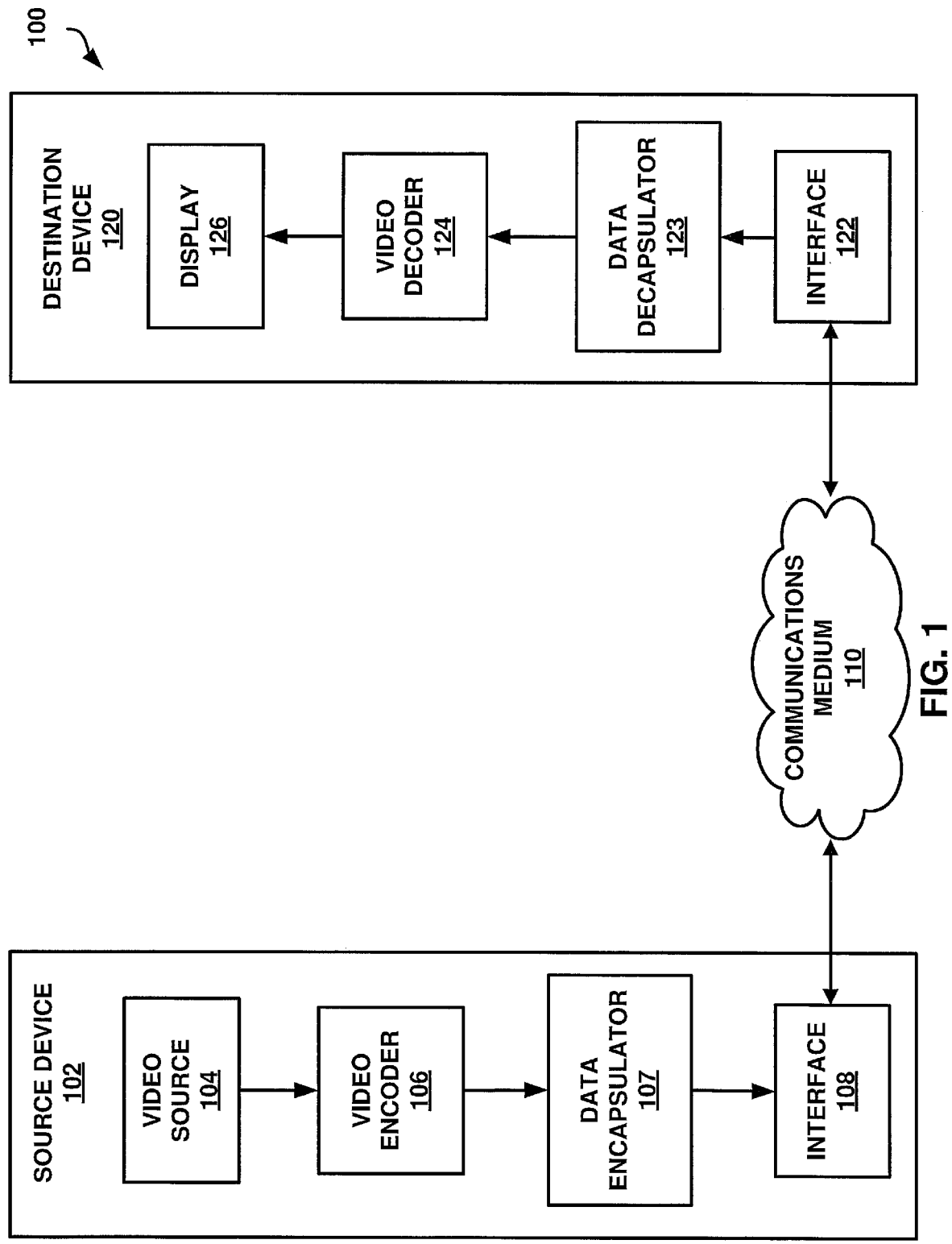
FIG. 1 is a block diagram illustrating an example of a system that may be configured to transmit coded video data according to one or more techniques of this disclosure.

In general, this disclosure describes various techniques for coding video data. In particular, this disclosure describes techniques for signaling quality ranking information associated with regions of omnidirectional video. Signaling of information according to the techniques described herein may be particularly useful for improving video distribution system performance by lowering transmission bandwidth and/or lowering coding complexity. It should be noted that although techniques of this disclosure are described with respect to ITU-T H.264 and ITU-T H.265, the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265. Thus, reference to ITU-T H.264 and ITU-T H.265 is for descriptive purposes and should not be construed to limit the scope of the techniques described herein. Further, it should be noted that incorporation by reference of documents herein should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a device comprises one or more processors configured to signal a syntax element indicating whether the omnidirectional video is stereoscopic, and conditionally signal one or more syntax elements specifying quality rankings of one or more regions based on whether the omnidirectional video is stereoscopic.

In one example, a non-transitory computer-readable storage medium comprises instructions stored thereon that, when executed, cause one or more processors of a device to signal a syntax element indicating whether the omnidirectional video is stereoscopic, and conditionally signal one or more syntax elements specifying quality rankings of one or more regions based on whether the omnidirectional video is stereoscopic.

In one example, an apparatus comprises means for signaling a syntax element indicating whether the omnidirectional video is stereoscopic, and means for conditionally signaling one or more syntax elements specifying quality rankings of one or more regions based on whether the omnidirectional video is stereoscopic.

In one example, a device comprises one or more processors configured to parse a syntax element indicating whether the omnidirectional video is stereoscopic, and conditionally parse one or more syntax elements specifying quality rankings of one or more regions based on whether the omnidirectional video is stereoscopic.

In one example, a non-transitory computer-readable storage medium comprises instructions stored thereon that, when executed, cause one or more processors of a device to parse a syntax element indicating whether the omnidirectional video is stereoscopic, and conditionally parse one or more syntax elements specifying quality rankings of one or more regions based on whether the omnidirectional video is stereoscopic.

In one example, an apparatus comprises means for parsing a syntax element indicating whether the omnidirectional video is stereoscopic, and means for conditionally parsing one or more syntax elements specifying quality rankings of one or more regions based on whether the omnidirectional video is stereoscopic.

The details of one or more examples are set forth in the accompanying drawings and the description below. Other features, objects, and advantages will be apparent from the description and drawings, and from the claims.

Video content typically includes video sequences comprised of a series of frames. A series of frames may also be referred to as a group of pictures (GOP). Each video frame or picture may include a one or more slices, where a slice includes a plurality of video blocks. A video block may be defined as the largest array of pixel values (also referred to as samples) that may be predictively coded. Video blocks may be ordered according to a scan pattern (e.g., a raster scan). A video encoder performs predictive encoding on video blocks and sub-divisions thereof. ITU-T H.264 specifies a macroblock including 16×16 luma samples. ITU-T H.265 specifies an analogous Coding Tree Unit (CTU) structure where a picture may be split into CTUs of equal size and each CTU may include Coding Tree Blocks (CTB) having 16×16, 32×32, or 64×64 luma samples. As used herein, the term video block may generally refer to an area of a picture or may more specifically refer to the largest array of pixel values that may be predictively coded, sub-divisions thereof, and/or corresponding coding parameters and/or structures. Further, according to ITU-T H.265, each video frame or picture may be partitioned to include one or more tiles, where a tile is a sequence of coding tree units corresponding to a rectangular area of a picture.

In ITU-T H.265, the CTBs of a CTU may be partitioned into Coding Blocks (CB) according to a corresponding quadtree block structure. According to ITU-T H.265, one luma CB together with two corresponding chroma CBs and associated syntax elements are referred to as a coding unit (CU). A CU is associated with a prediction unit (PU) structure defining one or more prediction units (PU) for the CU, where a PU is associated with corresponding reference samples. That is, in ITU-T H.265 the decision to code a picture area using intra prediction or inter prediction is made at the CU level and for a CU one or more predictions corresponding to intra prediction or inter prediction may be used to generate reference samples for CBs of the CU. In ITU-T H.265, a PU may include luma and chroma prediction blocks (PBs), where square PBs are supported for intra prediction and rectangular PBs are supported for inter prediction. Intra prediction data (e.g., intra prediction mode syntax elements) or inter prediction data (e.g., motion data syntax elements) may associate PUs with corresponding reference samples. Residual data may include respective arrays of difference values corresponding to each component of video data (e.g., luma (Y) and chroma (Cb and Cr)). Residual data may be in the pixel domain. A transform, such as, a discrete cosine transform (DCT), a discrete sine transform (DST), an integer transform, a wavelet transform, or a conceptually similar transform, may be applied to pixel difference values to generate transform coefficients. It should be noted that in ITU-T H.265, CUs may be further sub-divided into Transform Units (TUs). That is, an array of pixel difference values may be sub-divided for purposes of generating transform coefficients (e.g., four 8×8 transforms may be applied to a 16×16 array of residual values corresponding to a 16×16 luma CB), such sub-divisions may be referred to as Transform Blocks (TBs). Transform coefficients may be quantized according to a quantization parameter (QP). Quantized transform coefficients (which may be referred to as level values) may be entropy coded according to an entropy encoding technique (e.g., content adaptive variable length coding (CAVLC), context adaptive binary arithmetic coding (CABAC), probability interval partitioning entropy coding (PIPE), etc.). Further, syntax elements, such as, a syntax element indicating a prediction mode, may also be entropy coded. Entropy encoded quantized transform coefficients and corresponding entropy encoded syntax elements may form a compliant bitstream that can be used to reproduce video data. A binarization process may be performed on syntax elements as part of an entropy coding process. Binarization refers to the process of converting a syntax value into a series of one or more bits. These bits may be referred to as "bins."

Virtual Reality (VR) applications may include video content that may be rendered with a head-mounted display, where only the area of the spherical video that corresponds to the orientation of the user's head is rendered. VR applications may be enabled by omnidirectional video, which is also referred to as 360 degree spherical video or 360 degree video. Omnidirectional video is typically captured by multiple cameras that cover up to 360 degrees of a scene. A distinct feature of omnidirectional video compared to normal video is that, typically only a subset of the entire captured video region is displayed, i.e., the area corresponding to the current user's field of view (FOV) is displayed. A FOV is sometimes also referred to as viewport. In other cases, a viewport may be part of the spherical video that is currently displayed and viewed by the user. It should be noted that the size of the viewport can be smaller than or equal to the field of view. Further, it should be noted that omnidirectional video may be captured using monoscopic or stereoscopic cameras. Monoscopic cameras may include cameras that capture a single view of an object. Stereoscopic cameras may include cameras that capture multiple views of the same object (e.g., views are captured using two lenses at slightly different angles). Further, it should be noted that in some cases, images for use in omnidirectional video applications may be captured using ultra wide-angle lens (i.e., so-called fisheye lens). In any case, the process for creating 360 degree spherical video may be generally described as stitching together input images and projecting the stitched together input images onto a three-dimensional structure (e.g., a sphere or cube), which may result in so-called projected frames. Further, in some cases, regions of projected frames may be transformed, resized, and relocated, which may result in a so-called packed frame.

A region in an omnidirectional video picture may refer to a subset of the entire video region. It should be noted that regions of an omnidirectional video may be determined by the intent of a director or producer, or derived from user statistics by a service or content provider (e.g., through the statistics of which regions have been requested/seen by the most users when the omnidirectional video content was provided through a streaming service). For example, for an omnidirectional video capturing a sporting event, a region may be defined for a view including the center of the playing field and other regions may be defined for views of the stands. Regions may be used for data pre-fetching in omnidirectional video adaptive streaming by edge servers or clients, and/or transcoding optimization when an omnidirectional video is transcoded, e.g., to a different codec or projection mapping. Thus, signaling regions in an omnidirectional video picture may improve system performance by lowering transmission bandwidth and lowering decoding complexity.

Choi et al., ISO/IEC JTC1/SC29/WG11 N16636, "MPEG-A Part 20 (WD on ISO/IEC 23000-20): Omnidirectional Media Application Format," January 2017, Geneva, CH, which is incorporated by reference and herein referred to as Choi, defines a media application format that enables omnidirectional media applications. Choi specifies a list of projection techniques that can be used for conversion of a spherical or 360 degree video into a two-dimensional rectangular video; how to store omnidirectional media and the associated metadata using the International Organization for Standardization (ISO) base media file format (ISOBMFF); how to encapsulate, signal, and stream omnidirectional media using dynamic adaptive streaming over Hypertext Transfer Protocol (HTTP) (DASH); and which video and audio coding standards, as well as media coding configurations, may be used for compression and playback of the omnidirectional media signal.

Figure 2A:
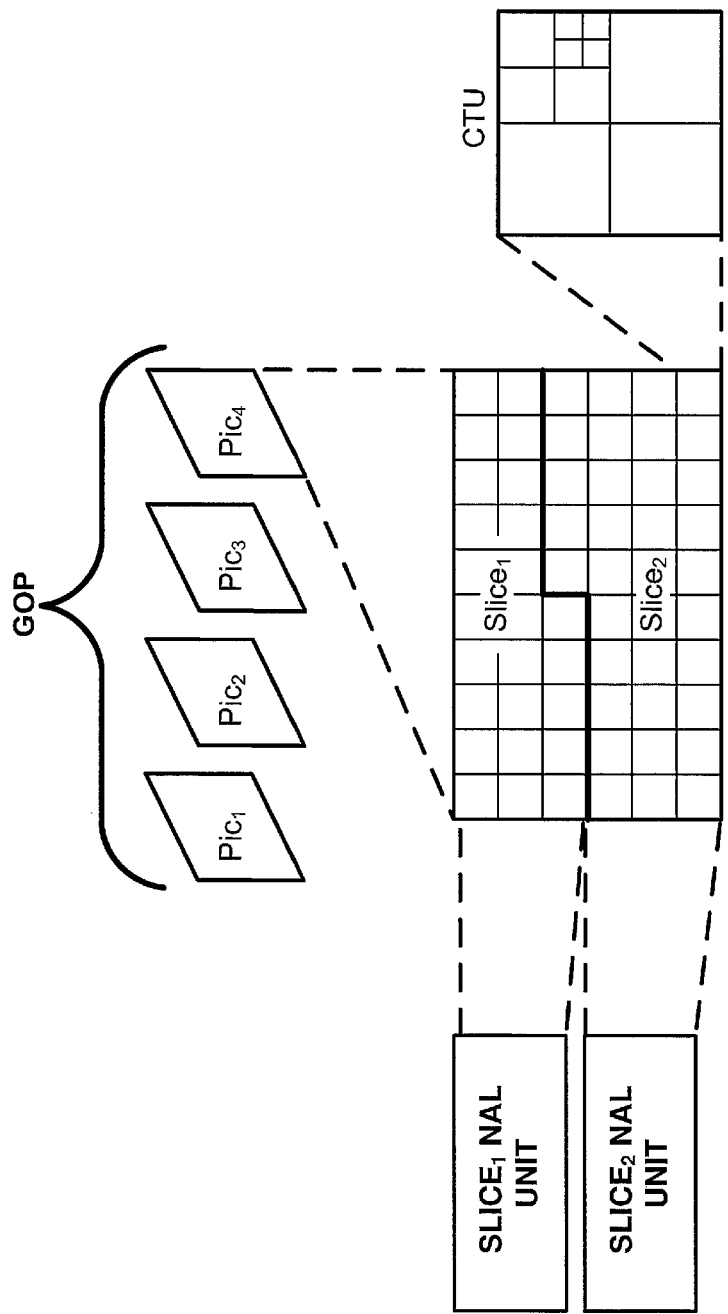
FIG. 2A is a conceptual diagram illustrating coded video data and corresponding data structures according to one or more techniques of this disclosure.
Figure 2B:
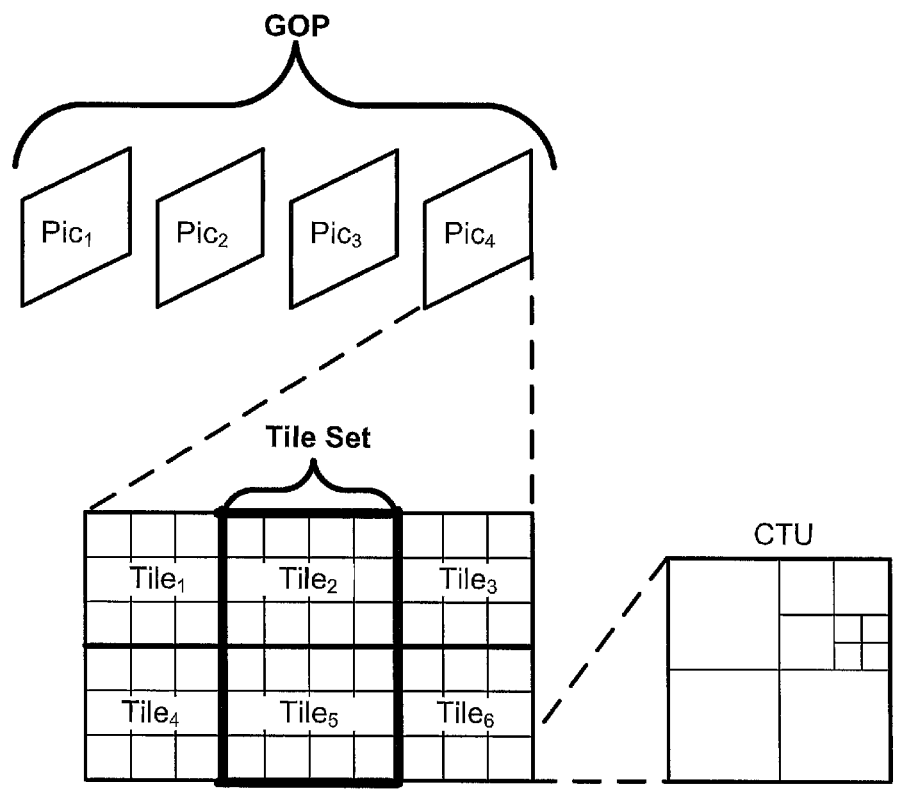
FIG. 2B is a conceptual diagram illustrating coded video data and corresponding data structures according to one or more techniques of this disclosure.

As described above, according to ITU-T H.265, each video frame or picture may be partitioned to include one or more slices and further partitioned to include one or more tiles. FIGS. 2A-2B are conceptual diagrams illustrating an example of a group of pictures including slices and further partitioning pictures into tiles. In the example illustrated in FIG. 2A, $Pic_4$ is illustrated as including two slices (i.e., $Slice_1$ and $Slice_2$) where each slice includes a sequence of CTUs (e.g., in raster scan order). In the example illustrated in FIG. 2B, $Pic_4$ is illustrated as including six tiles (i.e., $Tile_1$ to $Tile_6$), where each tile is rectangular and includes a sequence of CTUs. It should be noted that in ITU-T H.265, a tile may consist of coding tree units contained in more than one slice and a slice may consist of coding tree units contained in more than one tile. However, ITU-T H.265 provides that one or both of the following conditions shall be fulfilled: (1) All coding tree units in a slice belong to the same tile; and (2) All coding tree units in a tile belong to the same slice. Thus, with respect to FIG. 2B, each of the tiles may belong to a respective slice (e.g., $Tile_1$ to $Tile_6$ may respectively belong to slices, $Slice_1$ to $Slice_6$) or multiple tiles may belong to a slice (e.g., $Tile_1$ to $Tile_3$ may belong to $Slice_1$ and $Tile_4$ to $Tile_6$ may belong to $Slice_2$).

Further, as illustrated in FIG. 2B, tiles may form tile sets (i.e., $Tile_2$ and $Tile_5$ form a tile set). Tile sets may be used to define boundaries for coding dependencies (e.g., intra-prediction dependencies, entropy encoding dependencies, etc.) and as such, may enable parallelism in coding. For example, if the video sequence in the example illustrated in FIG. 2B corresponds to a nightly news program, the tile set formed by $Tile_2$ and $Tile_5$ may correspond to a visual region including a news anchor reading the news. ITU-T H.265 defines signaling that enables motion-constrained tile sets (MCTS). A motion-constrained tile set may include a tile set for which inter-picture prediction dependencies are limited to the collocated tile sets in reference pictures. Thus, it is possible to perform motion compensation for a given MCTS independent of the decoding of other tile sets outside the MCTS. For example, referring to FIG. 2B, if the tile set formed by $Tile_2$ and $Tile_5$ is a MCTS and each of $Pic_1$ to $Pic_3$ include collocated tile sets, motion compensation may be performed on $Tile_2$ and $Tile_5$ independent of coding $Tile_1$, $Tile_3$, $Tile_4$, and $Tile_6$ in $Pic_4$ and tiles collocated with tiles $Tile_1$, $Tile_3$, $Tile_4$, and $Tile_6$ in each of $Pic_1$ to $Pic_3$. Coding video data according to MCTS may be useful for video applications including omnidirectional video presentations.

Figure 3:
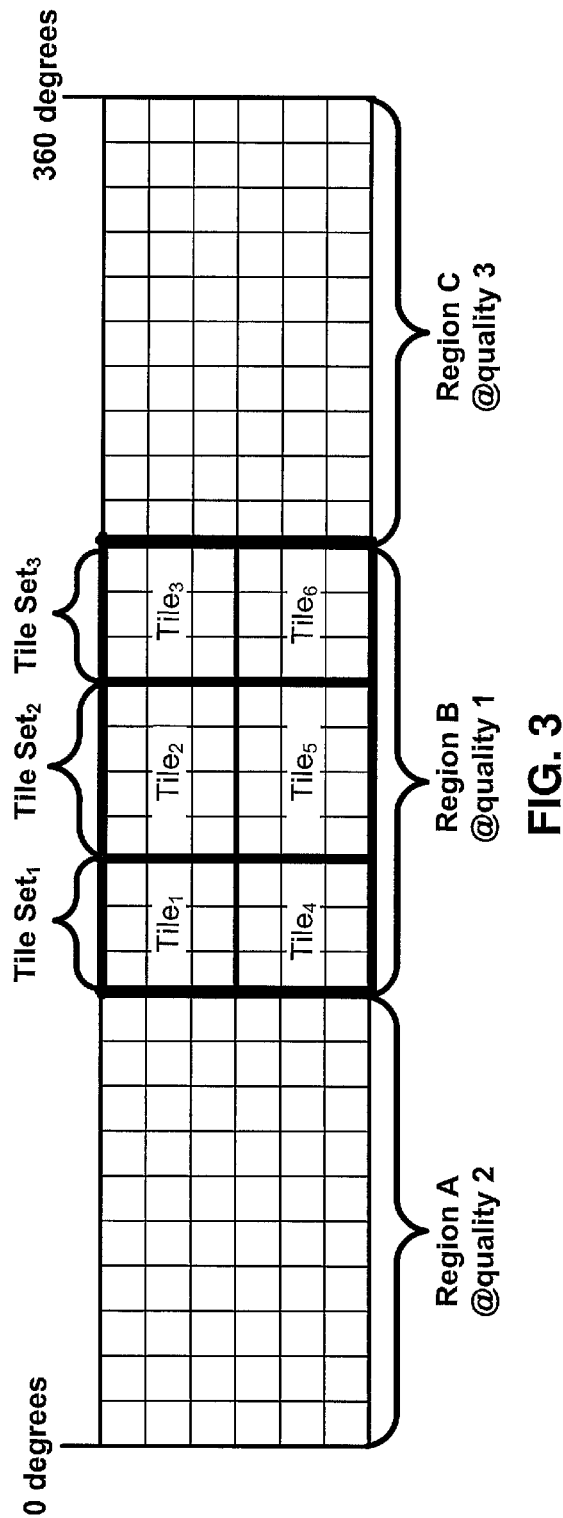
FIG. 3 is a conceptual diagram illustrating coded video data and corresponding data structures according to one or more techniques of this disclosure.

As illustrated in FIG. 3, tiles (i.e., $Tile_1$ to $Tile_6$) may form a region of an omnidirectional video. Further, the tile set formed by $Tile_2$ and $Tile_5$ may be a MCTS included within the region. Viewport dependent video coding, which may also be referred to as viewport dependent partial video coding, may be used to enable coding of only part of an entire video region. That is, for example, view port dependent video coding may be used to provide sufficient information for rendering of a current FOV. For example, omnidirectional video may be coded using MCTS, such that each potential region covering a viewport can be independently coded from other regions across time. In this case, for example, for a particular current viewport, a minimum set of tiles that cover a viewport may be sent to the client, decoded, and/or rendered. This process may be referred to as simple tile based partial decoding (STPD).

Referring again to FIG. 3, as illustrated in FIG. 3, the 360 degree video includes Region A, Region B, and Region C. In the example illustrated in FIG. 3, each of the regions are illustrated as including CTUs. As described above, CTUs may form slices of coded video data and/or tiles of video data. Further, as illustrated in FIG. 3, each of the regions are associated with a quality. As used herein the term quality may refer to the visual quality of an image that is rendered on an omnidirectional display (e.g., a head-mounted display) and may be inclusive of any video coding parameters that ultimately impact the visual quality of an image that is rendered on an omnidirectional display. For example, as described above, transform coefficients may be quantized according to a quantization parameter (QP). A quantization parameter adjusts the precision of coded transform coefficient values. A relatively higher quantization parameter results in lower precision of coded transform coefficient values and ultimately a relatively lower visual quality of an image that is rendered from the coded the transform coefficient values. As such, quality with respect to a region of omnidirectional may refer to a level of quantization or the like. It should be noted that other video coding parameters including, for example, but not limited to, bit-depth, filter parameters, partition structures, enabled prediction techniques, sub-sampling, frame-rate, may ultimately impact the visual quality of an image that is rendered on an omnidirectional display.

Further, as described above, video coding techniques may code areas of a picture according to video blocks, sub-divisions thereof, and/or corresponding structures and it should be noted that video coding techniques enable video coding parameters to be adjusted at various levels of a video coding structure, e.g., adjusted for slices, tiles, video blocks, and/or at sub-divisions. As such, quality of an image, including an omnidirectional image, may be adjusted at various sub-portions thereof according to various techniques. It should be noted that a region of omnidirectional video does not necessarily need to align with video coding boundaries. For example, referring again to FIG. 3, an arbitrary sized and shaped region (a 256×128 luma sample region at the center of the image) may be defined. In such examples, quality of the region may be determined as a function two or more video coding parameters that ultimately impact the visual quality. For example, for an arbitrary shaped and sized region, quality may be determined by averaging two or more quantization parameters associated with the region. As described in further detail below, it may be useful signal relative qualities of regions of omnidirectional video.

Referring again to FIG. 3, in one example, the 360 degree video illustrated in FIG. 3 may represent a sporting event where Region A and Region C include views of the stands of a stadium and Regions B includes a view of the playing field (e.g., the video is captured by a 360 degree camera placed at the 50-yard line). In this example, Region A and Region C may be encoded with a higher quantization parameter than Region B and thus have relative lower qualities than Region B. It should be noted that in some cases, a region or sub-region of video may be encoded at multiple levels of quality. For example, for an adaptive streaming application, a MCTS included within a region (e.g., Tile Set$_2$ in FIG. 3) may be coded using multiple tile tracks where each track is encoded using a specified quality.

Figure 4:
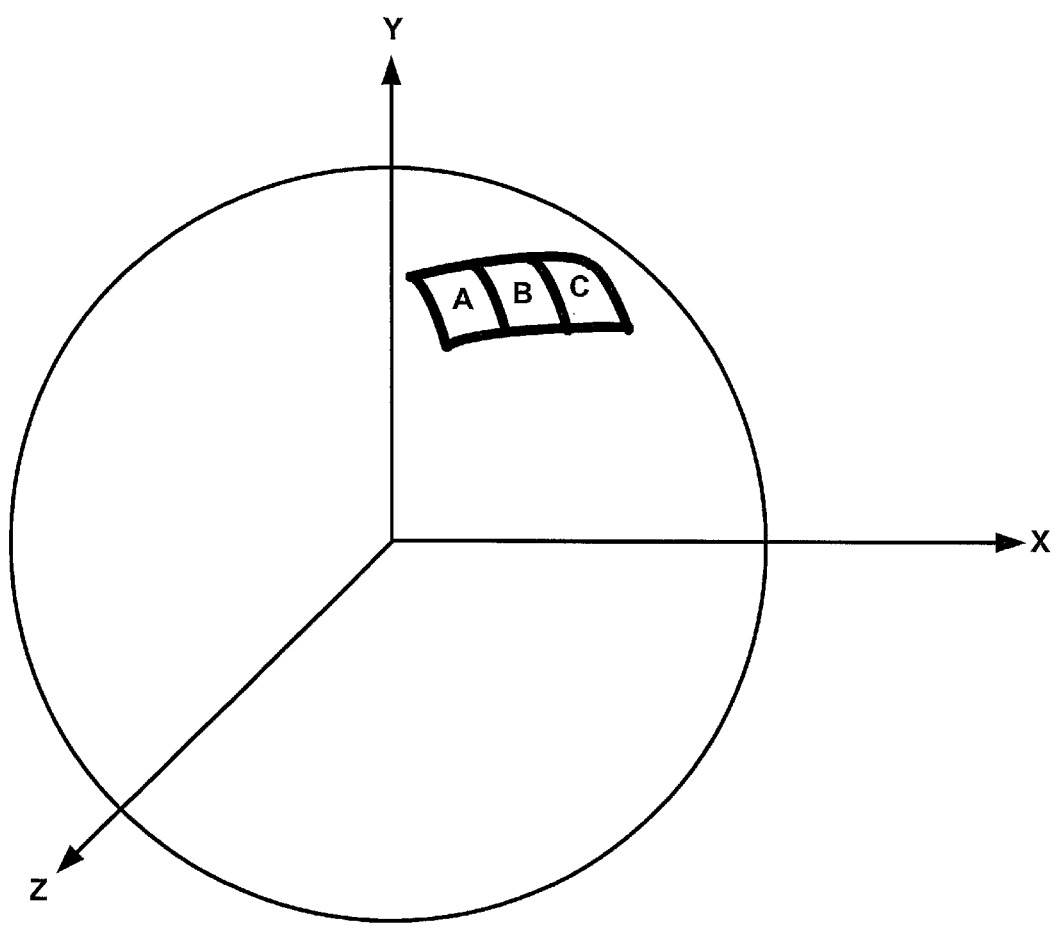
FIG. 4 is a conceptual diagram illustrating regions of video on a sphere according to one or more techniques of this disclosure.
Figure 5:
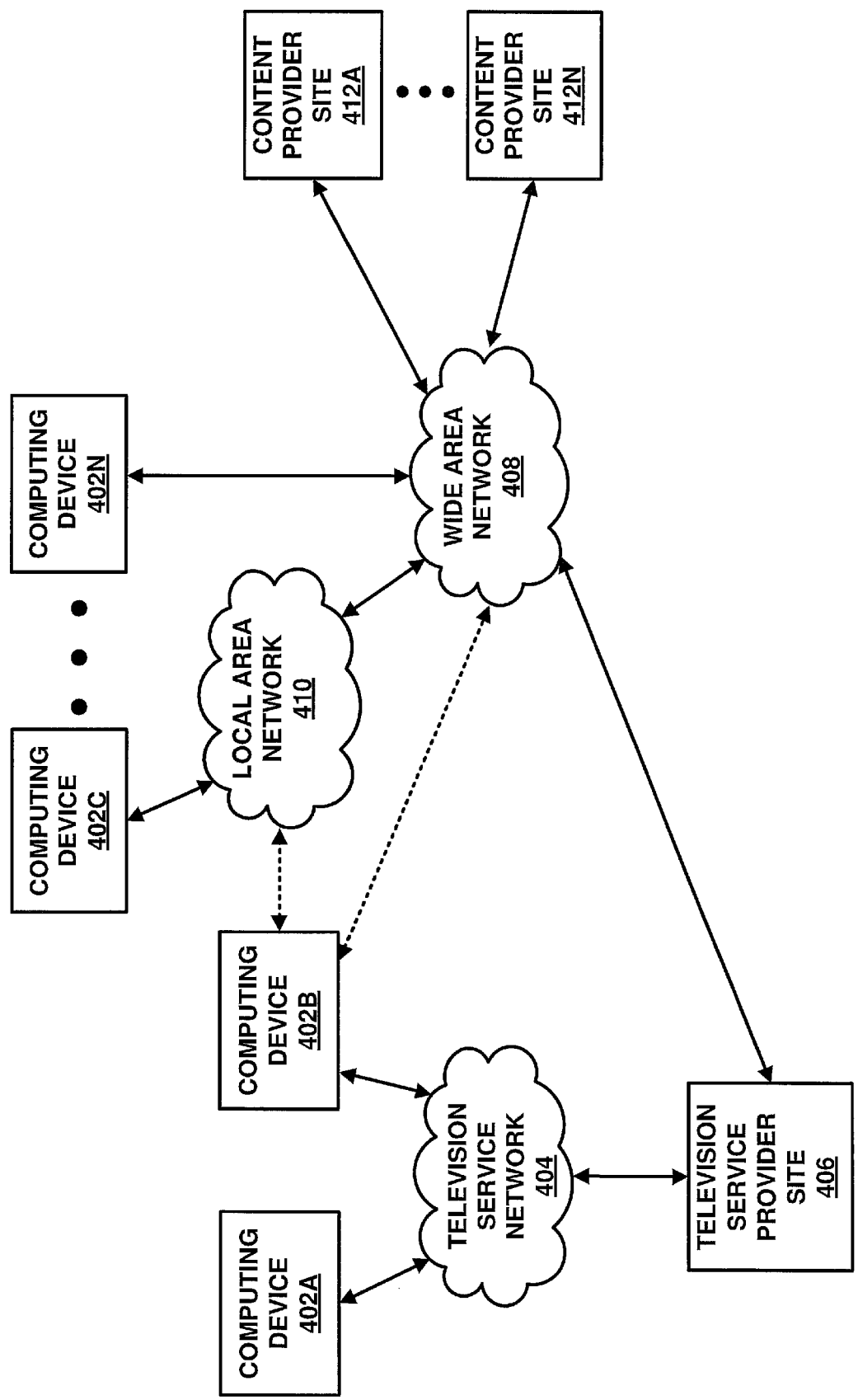
FIG. 5 is a block diagram illustrating an example of components that may be included in an implementation of a system that may be configured to distribute coded video data according to one or more techniques of this disclosure.

It should be noted that regions of omnidirectional video may include regions on a sphere. Choi describes where a region on a sphere may be specified by four great circles, where a great circle (also referred to as a Riemannian circle) is an intersection of the sphere and a plane that passes through the center point of the sphere, where the center of the sphere and the center of a great circle are co-located. Choi further describes where a region on a sphere may be specified by two yaw circles and two pitch circles, where a yaw circle is a circle on the sphere connecting all points with the same yaw value, and pitch circle is a circle on the sphere connecting all points with the same pitch value. FIG. 4 is a conceptual diagram illustrating an example of regions of a sphere. In the example illustrated in FIG. 4 each of regions A, B, and C represent respective regions on a sphere. In one example, region B may correspond to a region on sphere that is encoded with higher quality compared to Region A and Region C.

As described above, Choi specifies a list of projection techniques that can be used for conversion of a spherical or 360 degree video into a two-dimensional rectangular video. Choi specifies where a projected frame is a frame that has a representation format by a 360 degree video projection indicator and where a projection is the process by which a set of input images are projected onto a projected frame. Further, Choi specifies where a projection structure includes a three-dimensional structure including one or more surfaces on which the captured image/video content is projected, and from which a respective projected frame can be formed. Finally, Choi provides where a region-wise packing includes a region-wise transformation, resizing, and relocating of a projected frame and where a packed frame is a frame that results from region-wise packing of a projected frame. Thus, in Choi, the process for creating 360 degree spherical video may be described as including image stitching, projection, and region-wise packing. It should be noted that Choi specifies a coordinate system, omnidirectional projection formats, including an equirectangular projection, a rectangular region-wise packing format, and an omnidirectional fisheye video format, for the sake of brevity, a complete description of all of these sections of Choi is not provided herein. However, reference is made to the relevant sections of Choi.

It should be noted that in Choi, if region-wise packing is not applied, the packed frame is identical to the projected frame. Otherwise, regions of the projected frame are mapped onto a packed frame by indicating the location, shape, and size of each region in the packed frame. Further, in Choi, in the case of stereoscopic 360 degree video, the input images of one time instance are stitched to generate a projected frame representing two views, one for each eye. Both views can be mapped onto the same packed frame and encoded by a traditional two-dimensional video encoder. Alternatively, Choi provides, where each view of the projected frame can be mapped to its own packed frame, in which case, the image stitching, projection, and region-wise packing is similar to the monoscopic case described above. Further, in Choi, a sequence of packed frames of either the left view or the right view can be independently coded or, when using a multiview video encoder, predicted from the other view. Finally, it should be noted that in Choi, the image stitching, projection, and region-wise packing process can be carried out multiple times for the same source images to create different versions of the same content, e.g. for different orientations of the projection structure and similarly, the region-wise packing process can be performed multiple times from the same projected frame to create more than one sequence of packed frames to be encoded. It should be noted that a region defined by a quality indication (for example, as described above with respect to FIG. 3) is not necessarily the same as the regions defined by region-wise packing.

Choi specifies a file format that generally supports the following types of metadata: (1) metadata specifying the projection format of the projected frame; (2) metadata specifying the area of the spherical surface covered by the projected frame; (3) metadata specifying the orientation of the projection structure corresponding to the projected frame in a global coordinate system; (4) metadata specifying region-wise packing information; and (5) metadata specifying optional region-wise quality ranking.

It should be noted that with respect to the equations used herein, the following arithmetic operators may be used:
+ Addition
− Subtraction (as a two-argument operator) or negation (as a unary prefix operator)
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

It should be noted that with respect to the equations used herein, the following logical operators may be used:
x && y Boolean logical "and" of x and y
x | | y Boolean logical "or" of x and y
! Boolean logical "not"
x ? y : z If x is TRUE or not equal to 0, evaluates to the value of y; otherwise, evaluates to the value of z.

It should be noted that with respect to the equations used herein, the following relational operators may be used:

| | |
|---|---|
| > | Greater than |
| >= | Greater than or equal to |
| < | Less than |
| <= | Less than or equal to |
| == | Equal to |
| != | Not equal to |

With respect to omnidirectional projection formats, Choi provides the following for an equirectangular projection:
The samples of the projected frame at locations (i, j) correspond to angular coordinates (ϕ, θ) as specified in this clause. The angular coordinates (ϕ, θ) correspond to the yaw and pitch angles, respectively, in the coordinate system [where yaw rotates around the Y (vertical, up) axis, pitch around the X (lateral, side-to-side) axis, and roll around the Z (back-to-front) axis. Rotations are extrinsic, i.e., around the X, Y, and Z fixed reference axes. The angles increase counter-clockwise when looking towards the origin. Where the range of yaw is −180 degrees, inclusive, to 180 degrees, exclusive; the range of pitch is −90 degrees, inclusive, to 90 degrees, exclusive; and the range of roll is −180 degrees, inclusive, to 180 degrees, exclusive.]
When RegionWisePackingBox is absent, proj_frame_width and proj_frame_height are inferred to be equal to width and height of VisualSampleEntry.
When CoverageInformationBox is absent, hor_range is inferred to be equal to 36000 and ver_range is inferred to be equal to 18000.
The variables yawMin, yawMax, pitchMin, and pitchMax are derived as follows:
NOTE: The value ranges of the variables yawMin, yawMax, pitchMin, and pitchMax are not limited to that of the yaw and pitch angles as specified above.

yawMin=(center_yaw−hor_range÷2)*0.01*π÷180 yawMax=(center_yaw+hor_range÷2)*0.01*π÷180 pitchMin=(center_pitch−ver_range÷2)*0.01*π÷180 pitchMax=(center_pitch+ver_range÷2)*0.01*π÷180

For i equal to 0 to proj_frame_width−1, inclusive, and j equal to 0 to proj_frame_height−1, inclusive, the corresponding angular coordinates (ϕ, θ) for the luma sample locations, in radians, are given by the following equirectangular mapping equations
For the chroma format and chroma location type LocType in use, the values of CenterLeftOffsetC, CenterTopOffsetC, FrameWidthC, and FrameHeightC are specified in Table 1:

TABLE 1

| Chroma format | LocType | CenterLeft OffsetC | CenterTop OffsetC | FrameWidthC | FrameHeightC |
|---|---|---|---|---|---|
| 4:2:0 | 0 | 0.125 | 0.25 | proj_frame_width/2 | proj_frame_height/2 |
| 4:2:0 | 1 | 0.25 | 0.25 | proj_frame_width/2 | proj_frame_height/2 |
| 4:2:0 | 2 | 0.125 | 0.125 | proj_frame_width/2 | proj_frame_height/2 |
| 4:2:0 | 3 | 0.25 | 0.125 | proj_frame_width/2 | proj_frame_height/2 |
| 4:2:0 | 4 | 0.125 | 0.375 | proj_frame_width/2 | proj_frame_height/2 |
| 4:2:0 | 5 | 0.25 | 0.375 | proj_frame_width/2 | proj_frame_height/2 |
| 4:2:2 | — | 0.125 | 0.5 | proj_frame_width/2 | proj_frame_height/2 |
| 4:4:4 | — | 0.5 | 0.5 | proj_frame_width | proj_frame_height |

For i equal to 0 to FrameWidthC−1, inclusive, and j equal to 0 to FrameHeightC−1, inclusive, the corresponding angular coordinates (ϕ, θ) for the chroma sample locations, in radians, are given by the following equirectangular mapping equations:

ϕ=(i+CenterLeftOffsetC)*(yawMax−yawMin)÷FrameWidthC+yawMin

θ=(j+CenterTopOffsetC)*(pitchMin−pitchMax)÷FrameHeightC−pitchMin

With respect to region-wise packing, Choi provides the following definition, syntax, and semantics for a rectangular region-wise packing:
Definition
RectRegionPacking(i) specifies how a source rectangular region of a projected frame is packed onto a destination rectangular region of a packed frame. Horizontal mirroring and rotation by 90, 180, or 270 degrees can be indicated, and vertical and horizontal resampling are inferred from the width and height of regions.
Syntax
aligned(8) class RectRegionPacking(i) {
    unsigned int(32) proj_reg_width[i];
    unsigned int(32) proj_reg_height[i];

unsigned int(32) proj_reg_top[i];
    unsigned int(32) proj_reg_left[i];
    unsigned int(8) transform_type[i];
    unsigned int(32) packed_reg_width[i];
    unsigned int(32) packed_reg_height[i];
    unsigned int(32) packed_reg_top[i];
    unsigned int(32) packed_reg_left[i];
Semantics
proj_reg_width[i], proj_reg_height[i], proj_reg_top[i] and proj_reg_left[i] are indicated in units of pixels in a projected frame with width and height equal to proj_frame_width and proj_frame_height, respectively.
proj_reg_width[i] specifies the width of the i-th region of the projected frame. proj_reg_width[i] shall be greater than 0.
proj_reg_height[i] specifies the height of the i-th region of the projected frame. proj_reg_height[i] shall be greater than 0.
proj_reg_top[i] and proj_reg_left[i] specify the top sample row and the left-most sample column in the projected frame. The values shall be in the range from 0, inclusive, indicating the top-left corner of the projected frame, to proj_frame_height and proj_frame_width, exclusive, respectively.
proj_reg_width[i] and proj_reg_left[i] shall be constrained such that proj_reg_width[i]+proj_reg_left[i] is less than proj_frame_width.
proj_reg_height[i] and proj_reg_top[i] shall be constrained such that proj_reg_height[i]+proj_reg_top[i] is less than proj_frame_height.
When the projected frame is stereoscopic, proj_reg_width[i], proj_reg_height[i], proj_reg_top[i] and proj_reg_left[i] shall be such that the region identified by these fields on the projected frame is within a single constituent frame of the projected frame.
transform_type[i] specifies the rotation and mirroring that has been applied to the i-th region of a projected frame to map it to the packed frame. When transform_type[i] specifies both rotation and mirroring, rotation is applied after mirroring. The following values are specified and other values are reserved:
    1: no transform
    2: mirroring horizontally
    3: rotation by 180 degrees (counter-clockwise)
    4: rotation by 180 degrees (counter-clockwise) after mirroring horizontally
    5: rotation by 90 degrees (counter-clockwise) after mirroring horizontally
    6: rotation by 90 degrees (counter-clockwise)
    7: rotation by 270 degrees (counter-clockwise) after mirroring horizontally
    8: rotation by 270 degrees (counter-clockwise)
packed_reg_width[i], packed_reg_height[i], packed_reg_top[i], and packed_reg_left[i] specify the width, height, the top sample row, and the left-most sample column, respectively, of the region in the packed frame. The rectangle specified by packed_reg_width[i], packed_reg_height[i], packed_reg_top[i], and packed_reg_left[i] shall be non-overlapping with the rectangle specified by packed_reg_width[j], packed_reg_height[j], packed_reg_top[j], and packed_reg_left[j] for any value of j in the range of 0 to i-1, inclusive.
It should be noted in the syntax above and the syntax used herein, unsigned int(n) refers to an unsigned integer having n-bits. Further, bit(n) refers to a bit value having n-bits.

As described above, Choi specifies how to store omnidirectional media and the associated metadata using the International Organization for Standardization (ISO) base media file format (ISOBMFF). Further, Choi specifies where the file format supports the following types of boxes: a scheme type box (SchemeTypeBox), a scheme information box (SchemeInformationBox), a projected omnidirectional video box (ProjectedOmnidirectionalVideoBox), a stereo video box (StereoVideoBox), a fisheye omnidirectional video box (FisheyeOmnidirectionalVideoBox), a region-wise packing box (RegionWisePackingBox), and a projection orientation box (ProjectionOrientationBox). It should be noted that Choi specifies additional types boxes, for the sake of brevity, a complete description of all the type of boxes specified in Choi are not described herein. With respect to SchemeTypeBox, SchemeInformationBox, ProjectedOmnidirectionalVideoBox, StereoVideoBox, and RegionWisePackingBox, Choi provides the following:

The use of the omnidirectional video scheme for the restricted video sample entry type 'resv' indicates that the decoded pictures are either fisheye video pictures or packed frames containing either monoscopic or stereoscopic content. The use of the omnidirectional video scheme is indicated by scheme_type equal to 'odvd' (omnidirectional video) within the SchemeTypeBox.

The format of the projected monoscopic frames is indicated with the ProjectedOmnidirectionalVideoBox contained within the SchemeInformationBox. The format of fisheye video is indicated with the FisheyeOmnidirectionalVideoBox contained within the SchemeInformationBox. One and only one of ProjectedOmnidirectionalVideoBox and FisheyeOmnidirectionalVideoBox shall be present in the SchemeInformationBox when the scheme type is 'odvd'.

When the ProjectedOmnidirectionalVideoBox is present in the SchemeInformationBox, StereoVideoBox and RegionWisePackingBox may be present in the same SchemeInformationBox. When FisheyeOmnidirectionalVideoBox is present in the SchemeInformationBox, StereoVideoBox and RegionWisePackingBox shall not be present in the same SchemeInformationBox.

For stereoscopic video, the frame packing arrangement of the projected left and right frames is indicated with the StereoVideoBox contained within the SchemeInformationBox. The absence of StereoVideoBox indicates that the omnidirectionally projected content of the track is monoscopic. When StereoVideoBox is present in the SchemeInformationBox for the omnidirectional video scheme, it shall indicate either top-bottom frame packing or side-to-side frame packing.

Optional region-wise packing is indicated with the RegionWisePackingBox contained within the SchemeInformationBox. The absence of RegionWisePackingBox indicates that no region-wise packing is applied.

With respect to the projected omnidirectional video box, Choi provides the following definition, syntax and semantics:
Definition
Box Type: 'povd'
Container: Scheme Information box ('schi')
Mandatory: No
Quantity: Zero or one (when scheme_type is equal to 'odvd', either 'povd' or 'fovd' must be present)
ProjectedOmnidirectionalVideoBox is used to indicate that samples contained in the track are projected or packed frames.

The properties of the projected frames are indicated with the following:
  the projection format of a monoscopic projected frame (C for monoscopic video contained in the track, CL and CR for left and right view of stereoscopic video);
  the orientation of the projection structure relative to the global coordinate system; and
  the spherical coverage of the projected omnidirectional video (i.e., the area on the spherical surface that is represented by the projected frame).
Syntax
aligned(8) class ProjectedOmnidirectionalVideoBox extends Box('povd') {
  ProjectionFormatBox( ); // mandatory
  ProjectionOrientationBox( ); // optional
  CoverageInformationBox( ); // optional
}
aligned(8) class ProjectionFormatBox( ) extends FullBox ('prfr', 0, 0) {
  ProjectionFormatStruct( );
}
aligned(8) class ProjectionFormatStruct( ) {
  bit(1) reserved=0;
  unsigned int(6) geometry_type;
  bit(1) reserved=0;
  unsigned int(8) projection_type;
}
Semantics
geometry_type indicates the mathematical convention where points within a space can be uniquely identified by a location in one or more dimensions. When geometry_type is equal to 1, the projection indicator is given in spherical coordinates, where $\phi$ is the azimuth (longitude) or the YawAngle and $\theta$ is the elevation (latitude) or the PitchAngle, according to the specified coordinate system. Other values of geometry_type are reserved.
projection_type indicates the particular mapping of the rectangular decoder picture output samples onto the coordinate system specified by geometry_type. When projection_type is equal to 1, geometry_type shall be equal to 1. projection_type equal to 1 indicates the a specified equirectangular projection. Other values of projection_type are reserved.
With respect to the Region-wise packing box, Choi provides the following definition, syntax, and semantics:
Definition
Box Type: 'rwpk'
Container: Scheme Information box ('schi')
Mandatory: No
Quantity: Zero or one
RegionWisePackingBox indicates that projected frames are packed region-wise and require unpacking prior to rendering.
Syntax

```
aligned(8) class RegionWisePackingBox extends Box('rwpk') {
  RegionWisePackingStruct( );
}
aligned(8) class RegionWisePackingStruct {
  unsigned int(8) num_regions;
  unsigned int(32) proj_frame_width;
  unsigned int(32) proj_frame_height;
  for (i = 0; i < num_regions; i++) {
    bit(4) reserved = 0;
    unsigned int(4) packing_type[i];
  }
```

```
  for (i = 0; i < num_regions; i++) {
    if (packing_type[i] == 0)
      RectRegionPacking(i);
  }
}
```

Semantics
num_regions specifies the number of packed regions. Value 0 is reserved.
proj_frame_width and proj_frame_height specify the width and height, respectively, of the projected frame.
packing_type specifies the type of region-wise packing. packing_type equal to 0 indicates rectangular region-wise packing. Other values are reserved.
With respect to the Projection orientation box, Choi provides the following definition, syntax, and semantics:
Definition
Box Type: 'pror'
Container: Projected omnidirectional video box ('povd')
Mandatory: No
Quantity: Zero or one
When the projection format is the equirectangular projection, the fields in this box provides the yaw, pitch, and roll angles, respectively, of the center point of the projected frame when projected to the spherical surface. In the case of stereoscopic omnidirectional video, the fields apply to each view individually rather than the frame-packed stereoscopic frame. When the ProjectionOrientationBox is not present, the fields orientation_yaw, orientation_pitch, and orientation_roll are all considered to be equal to 0.
Syntax

```
aligned(8) class ProjectionOrientationBox extends FullBox('pror',
version = 0, flags) {
  signed int(16) orientation_yaw;
  signed int(16) orientation_pitch;
  signed int(16) orientation_roll;
}
```

Semantics
orientation_yaw, orientation_pitch, and orientation_roll specify the yaw, pitch, and roll of the projection in units of 0.01 degrees relative to the global coordinate system. orientation_yaw shall be in the range of −18000 to 17999, inclusive. orientation_pitch shall be in the range of −9000 to 9000, inclusive. orientation_roll shall be in the range of −18000 to 18000, inclusive.
Further, with respect to a coverage information box, Choi provides the following definition, syntax, and semantics:
Definition
Box Type: 'covi'
Container: Projected omnidirectional video box (Povd')
Mandatory: No
Quantity: Zero or one
  This box provides information on the area on the spherical surface that is represented by the projected frame associated with the container ProjectedOmnidirectionalVideoBox. The absence of this box indicates that the projected frame is a representation of the full sphere. The fields in this box apply after the application of the ProjectionOrientationBox, when present.
  When the projection format is the equirectangular projection, the spherical region represented by the projected frame is the region specified by two yaw circles and two pitch circles.

Syntax

```
aligned(8) class CoverageInformationBox extends FullBox('covi',
version = 0, flags) {
    RegionOnSphereStruct(1);
}
```

Semantics

When RegionOnSphereStruct(1) is included in the CoverageInformationBox, the following applies:

center_yaw and center_pitch specify the center point of the spherical region represented by the projected frame, in units of 0.01 degrees, relative to the coordinate system specified through the ProjectionOrientationBox. center_yaw shall be in the range of −18000 to 17999, inclusive. center_pitch shall be in the range of −9000 to 9000, inclusive.

hor_range and ver_range specify the horizontal and vertical range, respectively, of the region represented by the projected frame, in units of 0.01 degrees. hor_range and ver_range specify the range through the center point of the region. hor_range shall be in the range of 1 to 36000, inclusive. ver_range shall be in the range of 1 to 18000, inclusive. center_pitch+ver_range÷2 shall not be greater than 9000. center_pitch−ver_range÷2 shall not be less than −9000.

As described above, Choi specifies techniques for streaming omnidirectional media. In this manner, Choi provides a generic timed metadata track syntax for indicating regions on a sphere, which may be useful for streaming omnidirectional media. The purpose for a timed metadata track in Choi is indicated by the sample entry type and the sample format of all metadata tracks starts with a common part and may be followed by an extension part that is specific to the sample entry of the metadata track.

Further, each sample specifies a region on a sphere. Choi provides the following definition, syntax, and semantics for a box which may be present in the sample entry (i.e., a Visual Sample Entry).

Definition

Exactly one RegionOnSphereConfigBox shall be present in the sample entry. RegionOnSphereConfigBox specifies the shape of the region specified by the samples. When the horizontal and vertical ranges of the region in the samples do not change, they can be indicated in the sample entry.

Syntax

```
class RegionOnSphereSampleEntry extends
MetaDataSampleEntry('rosp') {
    RegionOnSphereConfigBox( ); // mandatory
    Box[ ] other_boxes; // optional
}
class RegionOnSphereConfigBox extends FullBox('rosc', version = 0,
flags) {
    unsigned int(8) shape_type;
    bit(7) reserved = 0;
    unsigned int(1) dynamic_range_flag;
    if (dynamic_range_flag == 0) {
        unsigned int(16) static_hor_range;
        unsigned int(16) static_ver_range;
    }
    unsigned int(16) num_regions;
}
```

Semantics shape_type equal to 0 specifies that the region is specified by four great circles.

shape_type equal to 1 specifies that the region is specified by two yaw circles and two pitch circles.

shape_type values greater than 1 are reserved.

dynamic_range_flag equal to 0 specifies that the horizontal and vertical ranges of the region remain unchanged in all samples referring to this sample entry. dynamic_range_flag equal to 1 specifies that the horizontal and vertical ranges of the region is indicated in the sample format.

static_hor_range and static_ver_range specify the horizontal and vertical ranges, respectively, of the region for each sample referring to this sample entry in units of 0.01 degrees. static_hor_range and static_ver_range specify the ranges through the center point of the region.

num_regions specifies the number of regions in the samples referring to this sample entry. num_regions shall be equal to 1. Other values of num_regions are reserved.

Choi provides the following definition, syntax, and semantics for the sample format:

Definition

Each sample specifies a region on a sphere. The RegionOnSphereSample structure may be extended in derived track formats.

Syntax

```
aligned(8) RegionOnSphereStruct(range_included_flag) {
    signed int(16) center_yaw;
    signed int(16) center_pitch;
    if (range_included_flag) {
        unsigned int(16) hor_range;
        unsigned int(16) ver_range;
    }
}
aligned(8) RegionOnSphereSample( ) {
    for (i = 0; i < num_regions; i++)
        RegionOnSphereStruct(dynamic_range_flag)
}
```

Semantics

When RegionOnSphereStruct( ) is included in the RegionOnSphereSample( )structure, the following applies:

center_yaw and center_pitch specify the center point of the region specified by this sample in units of 0.01 degrees relative to the global coordinate system. center_yaw shall be in the range of −18000 to 17999, inclusive. center_pitch shall be in the range of −9000 to 9000, inclusive.

hor_range and ver_range, when present, specify the horizontal and vertical ranges, respectively, of the region specified by this sample in units of 0.01 degrees. hor_range and ver_range specify the range through the center point of the region.

As described above, it may be useful to signal relative qualities of regions of omnidirectional video. Hannuksela et al., ISO/IEC JTC1/SC29/WG11 MPEG2017/M40707: OMAF ROI-CE: Quality ranking indication—design resulting from the offline work" April 2017, Hobart, AU, which is incorporated by reference, and herein referred to as Hannuksela, describes techniques for signaling relative qualities of regions of omnidirectional video. In particular, Hannuksela describes a Sphere Region Quality Ranking Box and a 2 Dimensional Region Quality Ranking Box, each of which may be contained in a sample entry of a media track and which may be incorporated in the Omnidirectional Media Application Format description of Choi. It should be noted that a media track may be a track based on an ISOBMFF track or may be the same as a ISOBMFF track.

Hannuksela provides the following definition, syntax, and semantics for a Sphere Region Quality Ranking Box:

Definition
Box type: 'srqr'
Container: VisualSampleEntry
Mandatory (per an item): No
Quantity (per an item): At most one for each region_definition_type value
SphereRegionQualityRankingBox can be used to indicate quality ranking values of regions relative to other regions of the same track or regions of other tracks, as specified through SphereRegionQualityRankingBox or 2DRegionQualityRankingBox. When no SphereRegionQualityRankingBox or 2DRegionQualityRankingBox is present in a visual sample entry, the quality ranking for the visual track is not defined. Quality ranking values indicate a relative quality order of regions. When region A has a non-zero quality_ranking value smaller than the quality_ranking value of region B, region A has a higher quality than region B. When the quality ranking value is non-zero, the picture quality within the entire indicated region is approximately constant. The boundaries of the regions specified by the SphereRegionQualityRankingBox and the 2DRegionQualityRankingBox may or may not match.

Syntax

```
aligned(8) class SphereRegionQualityRankingBox extends
FullBox('srqr', 0, 0) {
    unsigned int(8) region_definition_type;
    unsigned int(8) num_regions;
    for (i = 0; i < num_regions; i++) {
        unsigned int(8) quality_ranking;
        unsigned int(2) view_idc;
        if (i == num_regions − 1)
            unsigned int(1) remaining_area_flag;
        else
            bit(1) reserved_bit = 0;
        bit(5) reserved = 0;
        if (remaining_area_flag == 0)
            RegionOnSphereStruct(1);
    }
}
```

Semantics
region_definition_type has identical semantics to shape_type of RegionOnSphereConfigBox.
num_regions specifies the number of regions for which the quality ranking information is given in this box. Value 0 is reserved.
quality_ranking specifies a quality ranking of the region. quality_ranking equal to 0 indicates that the quality ranking is not defined. When region A has a non-zero quality_ranking value smaller than the quality_ranking value of region B, region A has a higher quality than region B. When region A partly or entirely overlaps with region B, quality_ranking of region A shall be equal to quality_ranking of region B.
view_idc equal to 0 indicates that the content is monoscopic, 1 indicates that the region is on the left view of stereoscopic content, 2 indicates that the region is on the right view of stereoscopic content, 3 indicates that the region is on both the left and right views.
remaining_area_flag equal to 0 specifies that the region is defined by the RegionOnSphereStruct(1) structure. remaining_area_flag equal to 1 specifies that the region is the area not covered by any other regions defined by this box.
RegionOnSphereStruct(1) specifies the spherical location and size of the region relative to the global coordinate system, while the shape of the regions is indicated by region_definition_type.

Hannuksela provides the following definition, syntax, and semantics for a 2D Region Quality Ranking Box:

Definition
Box type: '2dqr'
Container: VisualSampleEntry
Mandatory (per an item): No
Quantity (per an item): Zero or one
2DRegionQualityRankingBox can be used to indicate quality ranking values of regions relative to other regions of the same track or regions of other tracks, as specified through SphereRegionQualityRankingBox or 2DRegionQualityRankingBox. When no SphereRegionQualityRankingBox or 2DRegionQualityRankingBox is present in a visual sample entry, the quality ranking for the visual track is not defined. Quality ranking values indicate a relative quality order of regions. When region A has a non-zero quality_ranking value smaller than the quality_ranking value of region B, region A has a higher quality than region B. When the quality ranking value is non-zero, the picture quality within the entire indicated region is approximately constant. The boundaries of the regions specified by the SphereRegionQualityRankingBox and the 2DRegionQualityRankingBox may or may not match.

Syntax

```
aligned(8) class 2DRegionQualityRankingBox extends
FullBox('2dqr', 0, 0) {
    unsigned int(8) num_regions;
    for (i = 0; i < num_regions; i++) {
        unsigned int(8) quality_ranking;
        unsigned int(2) view_idc;
        if (i == num_regions − 1)
            unsigned int(1) remaining_area_flag;
        else
            bit(1) reserved_bit = 0;
        bit(5) reserved = 0;
        if (remaining_area_flag == 0) {
            unsigned int(16) left_offset;
            unsigned int(16) top_offset;
            unsigned int(16) region_width;
            unsigned int(16) region_height;
        }
    }
}
```

Semantics
num_regions, quality_ranking, and view_idc are specified identically to the syntax elements with the same names in SphereRegionQualityRankingBox.
remaining_area_flag equal to 0 specifies that the region is defined by the left_offset, top_offset, region_width, and region_height, remaining_area_flag equal to 1 specifies that the region is the area not covered by any other regions defined by this box.
left_offset, top_offset, region_width, and region_height are integer values that indicate the position and size of the region. left_offset and top_offset indicate the horizontal and vertical coordinates, respectively, in luma samples, of the upper left corner of the region within the picture. region_width and region_height indicate the width and height, respectively, in luma samples, of the region within the picture. left_offset+region_width shall be less than width of VisualSampleEntry. top_offset+region_height shall be less than height of VisualSampleEntry.

The techniques for signaling the relative quality of regions of omnidirectional video provided in Hannuksela may be less than ideal.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

FIG. 4 is a conceptual drawing illustrating an example of components that may be included in an implementation of system 100. In the example implementation illustrated in FIG. 4, system 100 includes one or more computing devices 402A-402N, television service network 404, television service provider site 406, wide area network 408, local area network 410, and one or more content provider sites 412A-412N. The implementation illustrated in FIG. 4 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 4, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 4, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, 3$^{rd}$ Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 480 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 4, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. It should be noted that the term conforming bitstream may be used in place of the term compliant bitstream. As described above, the techniques for signaling the relative quality of regions of omnidirectional video provided in Hannuksela may be less than ideal. In one example, data encapsulator 107 may be configured to signal quality information according to one or more techniques described herein. It should be noted that data encapsulator 107 need not necessary be located in the same physical device as video encoder 106. For example, functions described as being performed by video encoder 106 and data encapsulator 107 may be distributed among devices illustrated in FIG. 4.

Referring to the SphereRegionQualityRankingBox in Hannuksela described above, in one example, according to the techniques described herein, data encapsulator 107 may be configured to signal a SphereRegionQualityRankingBox based on the following example syntax:

Syntax

```
aligned(8) class SphereRegionQualityRankingBox extends FullBox('srqr',
0, 0) {
    unsigned int(8) region_definition_type;
    unsigned int(8) num_regions;
    unsigned int(1) remaining_area_flag;
    bit(7) reserved = 0;
    for (i = 0; i < num_regions; i++) {
        unsigned int(8) quality_ranking;
        unsigned int(2) view_idc;
        bit(6) reserved = 0;
        if ((i < (num_regions-1)) ||
            (remaining_area_flag == 0))
                RegionOnSphereStruct(1);
    }
}
```

Semantics region_definition_type has identical semantics to shape_type of RegionOnSphereConfigBox.

num_regions specifies the number of regions for which the quality ranking information is given in this box. Value 0 is reserved.

quality_ranking specifies a quality ranking of the region. quality_ranking equal to 0 indicates that the quality ranking is not defined. When region A has a non-zero quality_ranking value smaller than the quality_ranking value of region B, region A has a higher quality than region B. When region A partly or entirely overlaps with region B, quality_ranking of region A shall be equal to quality_ranking of region B.

view_idc equal to 0 indicates that the content is monoscopic, 1 indicates that the region is on the left view of stereoscopic content, 2 indicates that the region is on the right view of stereoscopic content, 3 indicates that the region is on both the left and right views.

remaining_area_flag equal to 0 specifies that all the regions are defined by the RegionOnSphereStruct(1) structures. remaining_area_flag equal to 1 specifies that the first num_regions−1 regions are defined by RegionOnSphereStruct(1) structure and the last remaining region is the region on sphere within the coverage area, not covered by union of regions defined by first (num_regions−1) RegionOnSphereStruct(1) structures.

RegionOnSphereStruct(1) specifies the spherical location and size of the region relative to the global coordinate system, while the shape of the regions is indicated by region_definition_type.

It should be noted that in the example syntax and semantics above, remaining_area_flag is outside the for loop which is iterated for the number of regions. As such, the number of times that the presence of remaining_area_flag is checked is reduced in most cases (e.g., case where the number of regions is greater than 1). Further, it should also be noted that in the example syntax above a logical condition "(i<(num_regions−1))" is added on conditional signaling of RegionOnSphereStruct(1), addition of this logical condition ensures that RegionOnSphereStruct(1) is signaled for the first zero to num_regions−2 regions.

With respect to the syntax and semantics above, in one example, quality_ranking may be an unsigned int(6) and view_idc may be an unsigned int(2). This results in a signaling bit savings of one byte per region.

Referring to the SphereRegionQualityRankingBox in Hannuksela described above, the signaling of RegionOnSphereStruct(1) is conditioned on if (remaining_area_flag==0), in one example according to the techniques described herein, data encapsulator 107 may be configured to signal a SphereRegionQualityRankingBox based on the following example syntax:

Syntax

```
aligned(8) class SphereRegionQualityRankingBox extends FullBox('srqr', 0, 0) {
        unsigned int(8) region_definition_type;
        unsigned int(8) num_regions;
        for (i = 0; i < num_regions; i++) {
            unsigned int(8) quality_ranking;
            unsigned int(2) view_idc;
            if (i == num_regions − 1)
                unsigned int(1) remaining_area_flag;
            else
                bit(1) reserved_bit = 0;
            bit(5) reserved = 0;
            if ((i < (num_regions−1)) ||
                (remaining_area_flag == 0))
                RegionOnSphereStruct(1);
        }
}
```

In this example, the semantics of remaining_area_flag may be as follows:

remaining_area_flag equal to 0 specifies that the region is defined by the RegionOnSphereStruct(1) structure. remaining_area_flag equal to 1 specifies that the region is the area not covered by any other regions defined by this box. When not present remaining_area_flag is inferred to be equal to 0.

Further, in one example, according to the techniques described herein, data encapsulator 107 may be configured to signal a SphereRegionQualityRankingBox based on the following example syntax:

Syntax

```
aligned(8) class SphereRegionQualityRankingBox extends FullBox('srqr', 0, 0) {
        unsigned int(8) region_definition_type;
        unsigned int(8) num_regions;
        for (i = 0; i < num_regions; i++) {
            unsigned int(8) quality_ranking;
            unsigned int(2) view_idc;
            if (i == num_regions − 1)
                unsigned int(1) remaining_area_flag;
            else
                bit(1) reserved_bit = 0;
            bit(5) reserved = 0;
            if ((i < (num_regions−1)) ||  ((i == num_regions − 1)
&& (remaining_area_flag == 0))
                RegionOnSphereStruct(1);
        }
}
```

In this example the semantics of remaining_area_flag may be as follows:

remaining_area_flag equal to 0 specifies that the region is defined by the RegionOnSphereStruct(1) structure. remaining_area_flag equal to 1 specifies that the region is the area not covered by any other regions defined by this box. When not present remaining_area_flag is inferred to be equal to 0.

Referring to the SphereRegionQualityRankingBox in Hannuksela described above, the signaling of RegionOnSphereStruct(1) is conditioned on if (remaining_area_flag==0), in one example according to the techniques described herein, data encapsulator 107 may be configured to signal a SphereRegionQualityRankingBox based on the following example syntax:

Syntax

```
aligned(8) class SphereRegionQualityRankingBox extends FullBox('srqr', 0, 0) {
        int RemainingAreaFlag=0; // local variable, not field
        unsigned int(8) region_definition_type;
        unsigned int(8) num_regions;
        for (i = 0; i < num_regions; i++) {
            unsigned int(8) quality_ranking;
            unsigned int(2) view_idc;
            if (i == num_regions − 1) {
                unsigned int(1) remaining_area_flag;
                RemainingAreaFlag  = remaining_area_flag;
            }
            else
                bit(1) reserved_bit = 0;
            bit(5) reserved = 0;
            if (RemainingAreaFlag   == 0)
                RegionOnSphereStruct(1);
        }
}
```

In this example, the RemainingAreaFlag is a local variable that is initialized equal to a value of 0 and then when I is equal to num_regions−1 it is assigned value equal to the value of signaled syntax element remaining_area_flag. Further, RegionOnSphereStruct(1) is conditionally signaled based on this RemainingAreaFlag local variable value being equal to 0.

In one example, according to the techniques described herein, data encapsulator 107 may be configured to signal a SphereRegionQualityRankingBox based on the following example syntax and semantics:

Syntax

```
aligned(8) class SphereRegionQualityRankingBox extends
FullBox('srqr', 0, 0) {
        unsigned int(8) region_definition_type;
        unsigned int(8) num_regions;
        unsigned int(1) remaining_area_flag;
        unsigned int(1) is_stereo_content_flag;
        bit(6) reserved = 0;
        for (i = 0; i < num_regions; i++) {
             unsigned int(8) quality_ranking;
             if (is_stereo_content_flag==1) {
             unsigned int(2) view_idc;
             bit(6) reserved = 0;
             }
             if ((i < (num_regions-1)) || (remaining_area_flag == 0))
                  RegionOnSphereStruct(1);
        }
}
```

Semantics region_definition_type has identical semantics to shape_type of RegionOnSphereConfigBox.

num_regions specifies the number of regions for which the quality ranking information is given in this box. Value 0 is reserved.

remaining_area_flag equal to 0 specifies that all the regions are defined by the RegionOnSphereStruct(1) structures. remaining_area_flag equal to 1 specifies that the first num_regions−1 regions are defined by RegionOnSphereStruct(1) structure and the last remaining region is the region on sphere within the coverage area, not covered by union of regions defined by first (num_regions−1) RegionOnSphereStruct(1) structures.

In one example, remaining_area_flag may be signaled outside the for loop of num_regions as shown above but at a different location than the location shown above.

is_stereo_content_flag equal to 0 specifies that the content is monoscopic and view_idc is not signaled. is_stereo_content_flag equal to 1 indicates that the content is stereoscopic and view_idc is signaled and indicates the association of region on sphere with particular (left or right or both) views.

In one example, is_stereo_content_flag may be based on the following definition:

is_stereo_content_flag equal to 0 specifies view_idc is not signaled. is_stereo_content_flag equal to 1 specifies that view_idc is signaled and indicates the association of region with particular (left or right or both) views or monoscopic content.

It should be noted that in some examples, is_stereo_content_flag may be referred to as view_idc_presence_flag and view_idc_presence_flag may be interchangeable with is_stereo_content_flag in the syntax and semantics herein.

In one example, when view_idc is not signaled (i.e., when is_stereo_content_flag is equal to 0) view_idc may be inferred to be equal to 0.

quality_ranking specifies a quality ranking of the region. quality_ranking equal to 0 indicates that the quality ranking is not defined. When region A has a non-zero quality_ranking value smaller than the quality_ranking value of region B, region A has a higher quality than region B. When region A partly or entirely overlaps with region B, quality_ranking of region A shall be equal to quality_ranking of region B.

view_idc equal to 0 indicates that the content is monoscopic, 1 indicates that the region is on the left view of stereoscopic content, 2 indicates that the region is on the right view of stereoscopic content, 3 indicates that the region is on both the left and right views.

In one example, view_idc may be based on the following definition:

view_idc equal to 1 indicates that the region is on the left view of stereoscopic content, 2 indicates that the region is on the right view of stereoscopic content, 3 indicates that the region is on both the left and right views if StereoVideoBox is present or the region corresponds to monoscopic content if StereoVideoBox is absent. Value 0 is reserved. When not present view_idc is inferred to be equal to 3.

In one example, view_idc may be based on the following definition:

view_idc equal to 0 indicates that the content is monoscopic, 1 indicates that the region is on the left view of stereoscopic content, 2 indicates that the region is on the right view of stereoscopic content, 3 indicates that the region is on both the left and right views. When not present view_idc is inferred to be equal to 0.

In one example, view_idc may be based on the following definition:

view_idc equal to 0 indicates that the region is on the left view of stereoscopic content, 1 indicates that the region is on the right view of stereoscopic content, 2 indicates that the region is on both the left and right views if StereoVideoBox is present or the region corresponds to monoscopic content if StereoVideoBox is absent. Value 3 is reserved. When not present view_idc is inferred to be equal to 2.

RegionOnSphereStruct(1) specifies the spherical location and size of the region relative to the global coordinate system, while the shape of the regions is indicated by region_definition_type.

In one example, according to the techniques described herein, data encapsulator 107 may be configured to signal a SphereRegionQualityRankingBox based on the following example syntax and semantics:

Syntax

```
aligned(8) class SphereRegionQualityRankingBox extends
FullBox('srqr', 0, 0) {
        unsigned int(8) region_definition_type; ;
        unsigned int(1) remaining_area_flag;
        unsigned int(1) is_stereo_content_flag; ;
        if (is_stereo_content_flag==1) {
                  unsigned int(1) remaining_right_area_flag;
                  unsigned int(1) remaining_both_area_flag;
                  bit(4) reserved = 0; ;
        }
        else {
                  bit(6) reserved = 0;
        }
    unsigned int(8) num_regions;
        if (is_stereo_content_flag==1) {
                  unsigned int(8) num_both_regions;
                  unsigned int(8) num_right_regions;
        }
        for (i = 0; i < num_regions; i++) {
            unsigned int(8) quality_ranking;
            if ((i < (num_regions-1)) ||
            (remaining_area_flag == 0))
                  RegionOnSphereStruct(1);
        }
        for (j = 0; j < num_right_regions; j++) {
            unsigned int(8) quality_ranking;
            if ((j < (num_right_regions-1)) ||
            (remaining_right_area_flag == 0))
                  RegionOnSphereStruct(1);
        }
```

-continued

```
        for (k = 0; k < num_both_regions; k++) {
            unsigned int(8) quality_ranking;
            if ((k < (num_both_regions-1)) ||
                (remaining_both_area_flag == 0))
                    RegionOnSphereStruct(1);
        }
}
```

Semantics region_definition_type has identical semantics to shape_type of RegionOnSphereConfigBox.

remaining_area_flag equal to 0 specifies that when is_stereo_content_flag is equal to 0 all the regions or when is_stereo_content_flag is equal to 1 all the regions belonging to left view of the stereoscopic content are defined by the RegionOnSphereStruct(1) structures. remaining_area_flag equal to 1 specifies that the first num_regions−1 regions when is_stereo_content_flag is equal to 0 or first num_regions−1 regions belonging to only left view of the stereoscopic content are defined by RegionOnSphereStruct(1) structure and the last remaining region when is_stereo_content_flag is equal to 0 or the last remaining region belonging to only left view of the stereoscopic content when is_stereo_content_flag is equal to 1 is the region on sphere within the coverage area, not covered by union of regions defined by first (num_regions−1) RegionOnSphereStruct(1) structures.

is_stereo_content_flag equal to 0 specifies that the content is monoscopic. is_stereo_content_flag equal to 1 indicates that the content is stereoscopic.

remaining_right_area_flag equal to 0 specifies that all the regions belonging to only right view of the stereoscopic content are defined by the RegionOnSphereStruct(1) structures. remaining_right_area_flag equal to 1 specifies that the first num_right_regions−1 regions belonging to only right view of the stereoscopic content are defined by RegionOnSphereStruct(1) structure and the last remaining region belonging to only right view of the stereoscopic content is the region on sphere within the coverage area, not covered by union of regions defined by first (num_right_regions−1) RegionOnSphereStruct(1) structures.

remaining_both_area_flag equal to 0 specifies that all the regions belonging to both left and right view of the stereoscopic content are defined by the RegionOnSphereStruct(1) structures. remaining_both_area_flag equal to 1 specifies that the first num_both_regions−1 regions belonging to both left and right view of the stereoscopic content are defined by RegionOnSphereStruct(1) structure and the last remaining region belonging to both left and right view of the stereoscopic content is the region on sphere not covered by any other regions defined by first (num_both_regions−1) RegionOnSphereStruct(1) structures.

num_regions specifies the number of regions when is_stereo_content_flag is equal to 0 or number of regions belonging to only left view when is_stereo_content_flag is equal to 1 for which the quality ranking information is given in this box. Value 0 is reserved.

num_both_regions specifies the number of regions belonging to both left and right view for which the quality ranking information is given in this box.

num_right_regions specifies the number of regions belonging to only right view for which the quality ranking information is given in this box.

quality_ranking specifies a quality ranking of the region. quality_ranking equal to 0 indicates that the quality ranking is not defined. When region A has a non-zero quality_ranking value smaller than the quality_ranking value of region B, region A has a higher quality than region B. When region A partly or entirely overlaps with region B, quality_ranking of region A shall be equal to quality_ranking of region B.

RegionOnSphereStruct(1) specifies the spherical location and size of the region relative to the global coordinate system, while the shape of the regions is indicated by region_definition_type.

In one example, according to the techniques described herein, data encapsulator 107 may be configured to signal a SphereRegionQualityRankingBox based on the following example syntax and semantics:

Syntax

```
aligned(8) class SphereRegionQualityRankingBox extends
FullBox('srqr', 0, 0) {
        unsigned int(8) region_definition_type; ;
        unsigned int(1) remaining_area_flag;
        unsigned int(1) is_stereo_content_flag; ;
        if (is_stereo_content_flag==1) {
                unsigned int(1) remaining_right_area_flag;
                bit(5) reserved = 0; ;
        }
        else {
                bit(6) reserved = 0;
        }
    unsigned int(8) num_regions;
        if (is_stereo_content_flag==1) {
                unsigned int(8) num_both_regions;
                unsigned int(8) num_right_regions;
        }
        for (i = 0; i < num_regions; i++) {
            unsigned int(8) quality_ranking;
            if ((i < (num_regions-1)) ||
                (remaining_area_flag == 0))
                    RegionOnSphereStruct(1);
        }
        for (j = 0; j < num_right_regions; j++) {
            unsigned int(8) quality_ranking;
            if ((j < (num_right_regions-1)) ||
                (remaining_right_area_flag == 0))
                    RegionOnSphereStruct(1);
        }
        for (k = 0; k < num_both_regions; k++) {
            unsigned int(8) quality_ranking;
            RegionOnSphereStruct(1);
        }
}
```

Semantics region_definition_type has identical semantics to shape_type of RegionOnSphereConfigBox.

remaining_area_flag equal to 0 specifies that when is_stereo_content_flag is equal to 0 all the regions or when is_stereo_content_flag is equal to 1 all the regions belonging to only left view of the stereoscopic content are defined by the RegionOnSphereStruct(1) structures. remaining_area_flag equal to 1 specifies that the last remaining region when is_stereo_content_flag is equal to 0 or the last remaining region belonging to only left view of the stereoscopic content when is_stereo_content_flag is equal to 1 is the region on sphere within the coverage area, not covered by union of regions defined by first (num_regions−1) RegionOnSphereStruct(1) structures and num_both_regions RegionOnSphereStruct(1) structures.

is_stereo_content_flag equal to 0 specifies that the content is monoscopic. is_stereo_content_flag equal to 1 indicates that the content is stereoscopic.

num_regions specifies the number of regions when is_stereo_content_flag is equal to 0 or number of regions belonging to only left view when is_stereo_content_flag is equal to 1 for which the quality ranking information is given in this box. Value 0 is reserved.

remaining_right_area_flag equal to 0 specifies that all the regions belonging to only right view of the stereoscopic content are defined by the RegionOnSphereStruct(1) structures. remaining_right_area_flag equal to 1 specifies that last remaining region belonging to only right view of the stereoscopic content is the region on sphere within the coverage area, that is not covered by union of regions defined by first (num_right_regions−1) RegionOnSphereStruct(1) structures and num_both_regions RegionOnSphereStruct(1) structures.

num_both_regions specifies the number of regions belonging to both left and right view for which the quality ranking information is given in this box.

num_right_regions specifies the number of regions belonging to only right view for which the quality ranking information is given in this box.

quality_ranking specifies a quality ranking of the region. quality_ranking equal to 0 indicates that the quality ranking is not defined. When region A has a non-zero quality_ranking value smaller than the quality_ranking value of region B, region A has a higher quality than region B. When region A partly or entirely overlaps with region B, quality_ranking of region A shall be equal to quality_ranking of region B.

RegionOnSphereStruct(1) specifies the spherical location and size of the region relative to the global coordinate system, while the shape of the regions is indicated by region_definition_type.

It should be noted that in the example syntax above, the quality_ranking element in the j and k for loops may be referred to as quality_ranking_right and quality_ranking_both. In this case, the semantics of quality_ranking_right and quality_ranking_both may be as follows:

quality_ranking_right specifies a quality ranking of the region belonging to right view. quality_ranking_right equal to 0 indicates that the quality ranking is not defined. When region A has a non-zero quality_ranking_right value smaller than the quality_ranking_right value of region B, region A has a higher quality than region B. When region A partly or entirely overlaps with region B, quality_ranking_right of region A shall be equal to quality_ranking_right of region B.

quality_ranking_both specifies a quality ranking of the region belonging to both left and right view. quality_ranking_both equal to 0 indicates that the quality ranking is not defined. When region A has a non-zero quality_ranking_both value smaller than the quality_ranking_both value of region B, region A has a higher quality than region B. When region A partly or entirely overlaps with region B, quality_ranking_both of region A shall be equal to quality_ranking_both of region B.

With respect to all of the example semantics above for SphereRegionQualityRankingBox, in some examples, RegionOnSphereStruct(1) may be constrained such that RegionOnSphereStruct(1) shall be within the region on sphere which is included in spherical surface indicated by RegionOnSphereStruct(1) in the 'covi' (coverage information) box.

Referring to the 2DRegionQualityRankingBox described above, in one example, according to the techniques described herein, data encapsulator 107 may be configured to signal a 2DRegionQualityRankingBox based on the following example syntax and semantics:

Syntax

```
aligned(8) class 2DRegionQualityRankingBox extends FullBox('2dqr', 0, 0) {
    unsigned int(8) num_regions;
    unsigned int(1) remaining_area_flag;
    bit(7) reserved = 0;
    for (i = 0; i < num_regions; i++) {
        unsigned int(8) quality_ranking;
        unsigned int(2) view_idc;
        bit(6) reserved = 0;
        if ((i < (num_regions−1)) ||
            (remaining_area_flag == 0)) {
            unsigned int(16) left_offset;
            unsigned int(16) top_offset;
            unsigned int(16) region_width;
            unsigned int(16) region_height;
        }
    }
}
```

Semantics num_regions, quality_ranking, and view_idc are specified identically to the syntax elements with the same names in SphereRegionQualityRankingBox.

remaining_area_flag equal to 0 specifies that all the regions are defined by the left_offset, top_offset, region_width, and region_height, remaining_area_flag equal to 1 specifies that first num_regions−1 regions are defined by left_offset, top_offset, region_width, and region_height and the last remaining region is the area not covered by union of regions defined by first (num_regions−1) regions.

left_offset, top_offset, region_width, and region_height are integer values that indicate the position and size of the region. left_offset and top_offset indicate the horizontal and vertical coordinates, respectively, in luma samples, of the upper left corner of the region within the picture. region_width and region_height indicate the width and height, respectively, in luma samples, of the region within the picture. left_offset+region_width shall be less than width of VisualSampleEntry. top_offset+region_height shall be less than height of VisualSampleEntry.

It should be noted that in the example syntax above, a logical condition "(i<(num_regions−1))" is added for conditionally signaling of left_offset, top_offset, region_width, and region_height. Additional of this logical condition ensures that left_offset, top_offset, region_width, and region_height is signaled for the first zero to num_regions−2 regions.

With respect to the syntax and semantics above, in one example, quality_ranking may be an unsigned int(6) and view_idc may be an unsigned int(2). This saves 1 byte per region.

Referring to the 2DRegionQualityRankingBox in Hannuksela described above, the signaling of left_offset, top_offset, region_width, and region_height is conditioned on if (remaining_area_flag==0), in one example, according to the techniques described herein, data encapsulator 107 may be configured to signal a 2DRegionQualityRankingBox based on the following example syntax:

Syntax

```
aligned(8) class 2DRegionQualityRankingBox extends
FullBox('2dqr', 0, 0) {
        unsigned int(8) num_regions;
        for (i = 0; i < num_regions; i++) {
                unsigned int(8) quality_ranking;
                unsigned int(2) view_idc;
                if (i == num_regions − 1)
                        unsigned int(1) remaining_area_flag;
                else
                        bit(1) reserved_bit = 0;
                bit(5) reserved = 0;
                if ((i < (num_regions−1)) ||
                        (remaining_area_flag == 0)) {
                        unsigned int(16) left_offset;
                        unsigned int(16) top_offset;
                        unsigned int(16) region_width;
                        unsigned int(16) region_height;
                }
        }
}
```

In this example the semantics of remaining_area_flag may be as follows: remaining_area_flag equal to 0 specifies that the region is defined by the left_offset, top_offset, region_width, and region_height. remaining_area_flag equal to 1 specifies that the region is the area not covered by any other regions defined by this box. When not present remaining_area_flag is inferred to be equal to 0.

Further, in one example, according to the techniques described herein, data encapsulator 107 may be configured to signal a 2DRegionQualityRankingBox based on the following example syntax:

```
aligned(8) class 2DRegionQualityRankingBox extends
FullBox('2dqr', 0, 0) {
        unsigned int(8) num_regions;
        for (i = 0; i < num_regions; i++) {
                unsigned int(8) quality_ranking;
                unsigned int(2) view_idc;
                if (i == num_regions − 1)
                        unsigned int(1) remaining_area_flag;
                else
                        bit(1) reserved_bit = 0;
                bit(5) reserved = 0;
                if ((i < (num_regions−1)) || ((i == num_regions − 1)
&& (remaining_area_flag == 0)) {
                        unsigned int(16) left_offset;
                        unsigned int(16) top_offset;
                        unsigned int(16) region_width;
                        unsigned int(16) region_height;
                }
        }
}
```

In this example the semantics of remaining_area_flag may be as follows: remaining_area_flag equal to 0 specifies that the region is defined by the left_offset, top_offset, region_width, and region_height remaining_area_flag equal to 1 specifies that the region is the area not covered by any other regions defined by this box. When not present remaining_area_flag is inferred to be equal to 0.

Referring to the 2DRegionQualityRankingBox in Hannuksela described above, the signaling of left_offset, top_offset, region_width, and region_height is conditioned on if (remaining_area_flag==0), in one example according to the techniques described herein, data encapsulator 107 may be configured to signal a 2DRegionQualityRankingBox based on the following example syntax:

Syntax

```
aligned(8) class 2DRegionQualityRankingBox extends
FullBox('2dqr', 0, 0) {
        unsigned int(8) num_regions;
        for (i = 0; i < num_regions; i++) {
                int RemainingAreaFlag=0; // local variable, not field
                unsigned int(8) quality_ranking;
                unsigned int(2) view_idc;
                if (i == num_regions − 1) {
                        unsigned int(1) remaining_area_flag;
                RemainingAreaFlag   = remaining_area_flag;
        }
                else
                        bit(1) reserved_bit = 0;
                bit(5) reserved = 0;
                if (RemainingAreaFlag == 0) {
                        unsigned int(16) left_offset;
                        unsigned int(16) top_offset;
                        unsigned int(16) region_width;
                        unsigned int(16) region_height;
                }
        }
}
```

In this example the RemainingAreaFlag is a local variable that is initialized equal to a value of 0 and then when i is equal to num_regions−1 it is assigned value equal to the value of signaled syntax element remaining_area_flag. Also the left_offset, top_offset, region_width, and region_height is conditionally signaled based on this RemainingAreaFlag local variable value being equal to 0.

In one example, according to the techniques described herein, data encapsulator 107 may be configured to signal a 2DRegionQualityRankingBox based on the following example syntax and semantics:

Syntax

```
aligned(8) class 2DRegionQualityRankingBox extends FullBox('2dqr',
0, 0) {
        unsigned int(8) num_regions;
        unsigned int(1) remaining_area_flag;
        unsigned int(1) is_stereo_content_flag;
        bit(6) reserved = 0;
        for (i = 0; i < num_regions; i++) {
                unsigned int(8) quality_ranking;
                if (is_stereo_content_flag==1) {
                unsigned int(2) view_idc;
                bit(6) reserved = 0;
                }
                if ((i < (num_regions−1)) ||
                        (remaining_area_flag == 0)) {
                        unsigned int(16) left_offset;
                        unsigned int(16) top_offset;
                        unsigned int(16) region_width;
                        unsigned int(16) region_height;
                }
        }
}
```

Semantics num_regions, quality_ranking, and view_idc are specified identically to the syntax elements with the same names in SphereRegionQualityRankingBox.

remaining_area_flag equal to 0 specifies that all the regions are defined by the left_offset, top_offset, region_width, and region_height. remaining_area_flag equal to 1 specifies that first num_regions−1 regions are defined by left_offset, top_offset, region_width, and region_height and the last remaining region is the area not covered by union of regions defined by first (num_regions−1) regions.

In one example, remaining_area_flag may be based on the following definition:

remaining_area_flag equal to 0 specifies that all the regions are defined by the left_offset, top_offset, region_width, and region_height. remaining_area_flag equal to 1 specifies that the first num_regions−1 regions are defined by left_offset, top_offset, region_width, and region_height and the last remaining region is the area in the picture with width equal to width of VisualSampleEntry and height equal to height of VisualSampleEntry, not covered by union of regions defined by first (num_regions−1) regions.

In one example remaining_area_flag may be signaled outside the for loop of num_regions as shown above but at a different location than the location shown above.

is_stereo_content_flag equal to 0 specifies that the content is monoscopic and view_idc is not signaled. is_stereo_content_flag equal to 1 indicates that the content is stereoscopic and view_idc is signaled and indicates the association of region with particular (left or right or both) views.

In one example, when view_idc is not signaled (i.e. when is_stereo_content_flag is equal to 0) view_idc may be inferred to be equal to 0.

In one example, is_stereo_content_flag may be based on the following example definition:

is_stereo_content_flag equal to 0 specifies that view_idc is not signaled. is_stereo_content_flag equal to 1 specifies view_idc is signaled and indicates the association of region with particular (left or right or both) views or monoscopic content.

As described above, is_stereo_content_flag may be referred to as view_idc_presence_flag.

left_offset, top_offset, region_width, and region_height are integer values that indicate the position and size of the region. left_offset and top_offset indicate the horizontal and vertical coordinates, respectively, in luma samples, of the upper left corner of the region within the picture. region_width and region_height indicate the width and height, respectively, in luma samples, of the region within the picture. left_offset+region_width shall be less than width of VisualSampleEntry. top_offset+region_height shall be less than height of VisualSampleEntry.

In one example, the following example constraints may be imposed:
region_width shall not be equal to 0.
region_height shall not be equal to 0.

In another example, the following example constraints may be imposed:
region_width shall be greater than 0.
region_height shall be greater than 0.

With respect to all of the example semantics above for 2DRegionQualityRankingBox, in some examples, region_width and/or region_height may be constrained such that region_width and/or region_height shall not equal zero.

Further, in one example, if no RegionWisePackingBox is present (i.e., region-wise packing is not used), (left_offset+region_width) shall be constrained to be less than proj_frame_width and/or (top_offset+region_height) shall be constrained to be less than proj_frame_height. Further, in one example, each region rectangle indicated by left_offset, top_offset, region_width, and region_height shall be constrained to completely span within the packed frame. Further, in one example, when the packed frame is stereoscopic the region rectangle indicated by left_offset, top_offset, region_width, and region_height may be constrained to completely span within a single constituent frame of the packed frame.

In this manner, data encapsulator 107 represents an example of a device configured to signaling quality ranking information associated with regions of omnidirectional video.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I$^2$C, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I$^2$C, or any other logical and physical structure that may be used to interconnect peer devices. Data decapsulator 123 may be configured to receive a bitstream and metadata generated by data encapsulator 107 and perform a reciprocal decapsulation process.

Video decoder 124 may include any device configured to receive a bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. Display 126 may include a stereoscopic display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein. Destination device 120 may include a receiver device.

Figure 6:
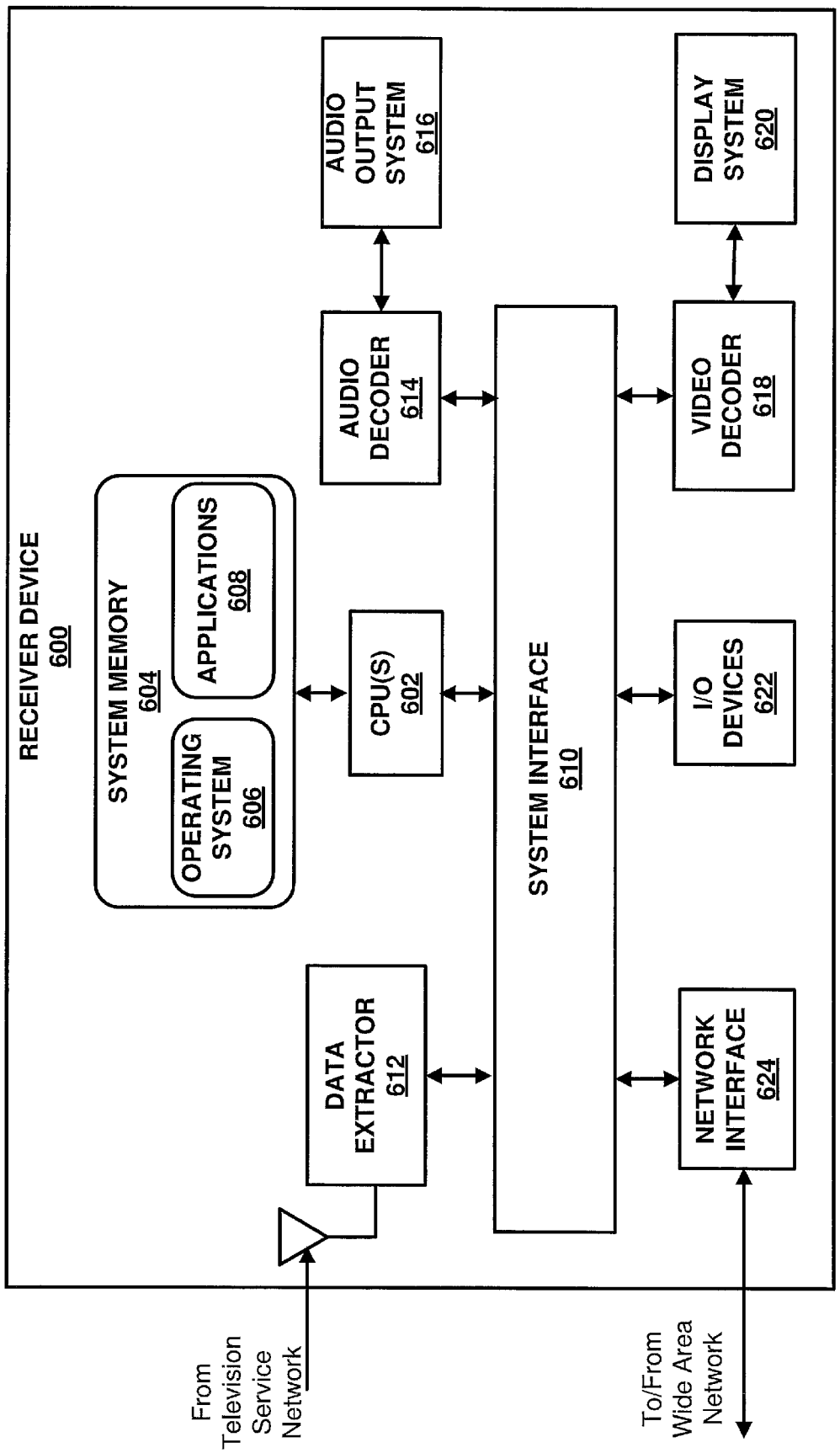
FIG. 6 is a block diagram illustrating an example of a receiver device that may implement one or more techniques of this disclosure.

FIG. 6 is a block diagram illustrating an example of a receiver device that may implement one or more techniques of this disclosure. That is, receiver device 600 may be configured to parse a signal based on the semantics described above. Receiver device 600 is an example of a computing device that may be configured to receive data from a communications network and allow a user to access multimedia content, including a virtual reality application. In the example illustrated in FIG. 6, receiver device 600 is configured to receive data via a television network, such as, for example, television service network 404 described above. Further, in the example illustrated in FIG. 6, receiver device 600 is configured to send and receive data via a wide area network. It should be noted that in other examples, receiver device 600 may be configured to simply receive data through a television service network 404. The techniques described herein may be utilized by devices configured to communicate using any and all combinations of communications networks.

As illustrated in FIG. 6, receiver device 600 includes central processing unit(s) 602, system memory 604, system interface 610, data extractor 612, audio decoder 614, audio output system 616, video decoder 618, display system 620, I/O device(s) 622, and network interface 624. As illustrated in FIG. 6, system memory 604 includes operating system 606 and applications 608. Each of central processing unit(s) 602, system memory 604, system interface 610, data extractor 612, audio decoder 614, audio output system 616, video decoder 618, display system 620, I/O device(s) 622, and network interface 624 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although receiver device 600 is illustrated as having distinct functional blocks, such an illustration is for descriptive purposes and does not limit receiver device 600 to a particular hardware architecture. Functions of receiver device 600 may be realized using any combination of hardware, firmware and/or software implementations.

CPU(s) 602 may be configured to implement functionality and/or process instructions for execution in receiver device 600. CPU(s) 602 may include single and/or multi-core central processing units. CPU(s) 602 may be capable of retrieving and processing instructions, code, and/or data structures for implementing one or more of the techniques described herein. Instructions may be stored on a computer readable medium, such as system memory 604.

System memory 604 may be described as a non-transitory or tangible computer-readable storage medium. In some examples, system memory 604 may provide temporary and/or long-term storage. In some examples, system memory 604 or portions thereof may be described as non-volatile memory and in other examples portions of system memory 604 may be described as volatile memory. System memory 604 may be configured to store information that may be used by receiver device 600 during operation. System memory 604 may be used to store program instructions for execution by CPU(s) 602 and may be used by programs running on receiver device 600 to temporarily store information during program execution. Further, in the example where receiver device 600 is included as part of a digital video recorder, system memory 604 may be configured to store numerous video files.

Applications 608 may include applications implemented within or executed by receiver device 600 and may be implemented or contained within, operable by, executed by, and/or be operatively/communicatively coupled to components of receiver device 600. Applications 608 may include instructions that may cause CPU(s) 602 of receiver device 600 to perform particular functions. Applications 608 may include algorithms which are expressed in computer programming statements, such as, for-loops, while-loops, if-statements, do-loops, etc. Applications 608 may be developed using a specified programming language. Examples of programming languages include, Java™, Jini™, C, C++, Objective C, Swift, Perl, Python, PhP, UNIX Shell, Visual Basic, and Visual Basic Script. In the example where receiver device 600 includes a smart television, applications may be developed by a television manufacturer or a broadcaster. As illustrated in FIG. 6, applications 608 may execute in conjunction with operating system 606. That is, operating system 606 may be configured to facilitate the interaction of applications 608 with CPUs(s) 602, and other hardware components of receiver device 600. Operating system 606 may be an operating system designed to be installed on set-top boxes, digital video recorders, televisions, and the like. It should be noted that techniques described herein may be utilized by devices configured to operate using any and all combinations of software architectures.

System interface 610 may be configured to enable communications between components of receiver device 600. In one example, system interface 610 comprises structures that enable data to be transferred from one peer device to another peer device or to a storage medium. For example, system interface 610 may include a chipset supporting Accelerated Graphics Port (AGP) based protocols, Peripheral Component Interconnect (PCI) bus based protocols, such as, for example, the PCI Express™ (PCIe) bus specification, which is maintained by the Peripheral Component Interconnect Special Interest Group, or any other form of structure that may be used to interconnect peer devices (e.g., proprietary bus protocols).

As described above, receiver device 600 is configured to receive and, optionally, send data via a television service network. As described above, a television service network may operate according to a telecommunications standard. A telecommunications standard may define communication properties (e.g., protocol layers), such as, for example, physical signaling, addressing, channel access control, packet properties, and data processing. In the example illustrated in FIG. 6, data extractor 612 may be configured to extract video, audio, and data from a signal. A signal may be defined according to, for example, aspects DVB standards, ATSC standards, ISDB standards, DTMB standards, DMB standards, and DOCSIS standards.

Data extractor 612 may be configured to extract video, audio, and data, from a signal. That is, data extractor 612 may operate in a reciprocal manner to a service distribution engine. Further, data extractor 612 may be configured to parse link layer packets based on any combination of one or more of the structures described above.

Data packets may be processed by CPU(s) 602, audio decoder 614, and video decoder 618. Audio decoder 614 may be configured to receive and process audio packets. For example, audio decoder 614 may include a combination of hardware and software configured to implement aspects of an audio codec. That is, audio decoder 614 may be configured to receive audio packets and provide audio data to audio output system 616 for rendering. Audio data may be coded using multi-channel formats such as those developed by Dolby and Digital Theater Systems. Audio data may be coded using an audio compression format. Examples of audio compression formats include Motion Picture Experts Group (MPEG) formats, Advanced Audio Coding (AAC) formats, DTS-HD formats, and Dolby Digital (AC-3) formats. Audio output system 616 may be configured to render audio data. For example, audio output system 616 may include an audio processor, a digital-to-analog converter, an amplifier, and a speaker system. A speaker system may include any of a variety of speaker systems, such as head-phones, an integrated stereo speaker system, a multi-speaker system, or a surround sound system.

Video decoder 618 may be configured to receive and process video packets. For example, video decoder 618 may include a combination of hardware and software used to implement aspects of a video codec. In one example, video decoder 618 may be configured to decode video data encoded according to any number of video compression standards, such as ITU-T H.262 or ISO/IEC MPEG-2 Visual, ISO/IEC MPEG-4 Visual, ITU-T H.264 (also known as ISO/IEC MPEG-4 Advanced video Coding (AVC)), and High-Efficiency Video Coding (HEVC). Display system 620 may be configured to retrieve and process video data for display. For example, display system 620 may receive pixel data from video decoder 618 and output data for visual presentation. Further, display system 620 may be configured to output graphics in conjunction with video data, e.g., graphical user interfaces. Display system 620 may comprise one of a variety of display devices such as a liquid crystal display (LCD), a plasma display, an organic light emitting diode (OLED) display, or another type of display device capable of presenting video data to a user. A display device may be configured to display standard definition content, high definition content, or ultra-high definition content.

I/O device(s) 622 may be configured to receive input and provide output during operation of receiver device 600. That is, I/O device(s) 622 may enable a user to select multimedia content to be rendered. Input may be generated from an input device, such as, for example, a push-button remote control, a device including a touch-sensitive screen, a motion-based input device, an audio-based input device, or any other type of device configured to receive user input. I/O device(s) 622 may be operatively coupled to receiver device 600 using a standardized communication protocol, such as for example, Universal Serial Bus protocol (USB), Bluetooth, ZigBee or a proprietary communications protocol, such as, for example, a proprietary infrared communications protocol.

Network interface 624 may be configured to enable receiver device 600 to send and receive data via a local area network and/or a wide area network. Network interface 624 may include a network interface card, such as an Ethernet card, an optical transceiver, a radio frequency transceiver, or any other type of device configured to send and receive information. Network interface 624 may be configured to perform physical signaling, addressing, and channel access control according to the physical and Media Access Control (MAC) layers utilized in a network. Receiver device 600 may be configured to parse a signal generated according to any of the techniques described above. In this manner, receiver device 600 represents an example of a device configured parse one or more syntax elements including information associated with a virtual reality application In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

The invention claimed is:

1. A method for determining quality information, the method comprising:
    parsing a syntax element num_regions specifying the number of quality ranking regions for which the quality ranking information is given;
    parsing a presence flag syntax element specifying whether a syntax element view_idc indicating a view associated with a quality ranking region is present; and
    conditionally parsing, for the number of quality ranking regions, the syntax element view_idc based on a value of the presence flag syntax element.

2. The method of claim 1, wherein the syntax element indicating a view associated with a quality ranking region indicates whether the view is one of: monoscopic content, a left view of stereoscopic content, a right view of stereoscopic content, or both a left and right view of stereoscopic content.

3. The method of claim 1, wherein the syntax element indicating a view associated with a quality ranking region is two bits and is immediately followed by six reserved bits.

4. The method of claim 1, wherein regions for the quality ranking information are sphere regions.

5. The method of claim 1, wherein regions for the quality ranking information are two dimensional regions.

6. The method of claim 1, wherein the syntax element specifying the number of quality ranking regions is the number of regions syntax element.

7. The method of claim 1, wherein the presence flag syntax element is a view idc presence flag syntax element.

8. The method of claim 1, wherein the syntax element indicating a view associated with a quality ranking region is a view idc syntax element.

9. A device comprising one or more processors configured to:
    parse a syntax element num_regions specifying the number of quality ranking regions for which the quality ranking information is given;
    parse a presence flag syntax element specifying whether a syntax element view_idc indicating a view associated with a quality ranking region is present; and
    conditionally parse, for the number of quality ranking regions, the syntax element view_idc based on a value of the presence flag syntax element.

10. The device of claim 9, wherein the syntax element indicating a view associated with a quality ranking region indicates whether the view is one of: monoscopic content, a left view of stereoscopic content, a right view of stereoscopic content, or both a left and right view of stereoscopic content.

11. The device of claim 10, wherein the syntax element indicating a view associated with a quality ranking region is two bits and immediately followed by six reserved bits.

12. The device of claim 9, wherein regions for the quality ranking information are sphere regions.

13. The device of claim 9, wherein regions for the quality ranking information are two dimensional regions.

14. The device of claim 9, wherein the syntax element specifying the number of quality ranking regions is the number of regions syntax element.

15. The device of claim 9, wherein the presence flag syntax element is a view idc presence flag syntax element.

* * * * *

UNITED STATES PATENT AND TRADEMARK OFFICE
CERTIFICATE OF CORRECTION

PATENT NO. : 10,880,617 B2
APPLICATION NO. : 16/607882
DATED : December 29, 2020
INVENTOR(S) : Sachin G. Deshpande It is certified that error appears in the above-identified patent and that said Letters Patent is hereby corrected as shown below:

On the Title Page

Please replace the Abstract with the following Abstract:
A device may be configured to signal information (for example, is_stereo_content_flag, remaining_right_area_flag, remaining_both_area_flag, num_both_regions and num_right_regions) associated with the relative quality of regions in an omni-directional video.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*